United States Patent
Wiechers

(10) Patent No.: US 10,956,953 B2
(45) Date of Patent: Mar. 23, 2021

(54) EARLY INITIATION OF THE PAYMENT PROCESS FOR CASH-ON-DELIVERY SHIPMENTS

(71) Applicant: Ralph Wiechers, Mayschoß (DE)

(72) Inventor: Ralph Wiechers, Mayschoß (DE)

(73) Assignee: Deutsche Post AG, Bonn (DE)

( * ) Notice: Subject to any disclaimer, the term of this patent is extended or adjusted under 35 U.S.C. 154(b) by 664 days.

(21) Appl. No.: 15/331,645

(22) Filed: Oct. 21, 2016

(65) Prior Publication Data

US 2017/0132691 A1    May 11, 2017

(30) Foreign Application Priority Data

Nov. 5, 2015  (DE) ...................... 10 2015 118 999.2

(51) Int. Cl.
*G06Q 30/06* (2012.01)
*G06Q 10/08* (2012.01)
(Continued)

(52) U.S. Cl.
CPC ..... *G06Q 30/0613* (2013.01); *G06Q 10/0833* (2013.01); *G06Q 20/12* (2013.01); *G06Q 30/0635* (2013.01); *G06Q 20/3223* (2013.01)

(58) Field of Classification Search
CPC ............... G06Q 30/0631; G06Q 50/32; G06Q 10/0833; G06Q 10/08; G06Q 20/12; G06Q 20/3223; G06Q 30/0613; G06Q 30/0601
(Continued)

(56) References Cited

U.S. PATENT DOCUMENTS 8,095,304 B2 * 1/2012 Blanton ................. G06Q 30/04
701/482
8,566,238 B2 * 10/2013 Hogl ..................... G06Q 20/02
455/406

(Continued)

FOREIGN PATENT DOCUMENTS

CN          1381017 A      11/2002
CN        103544581 A       1/2014
(Continued)

OTHER PUBLICATIONS

Wikipedia: "Track and trace", Internet Article, Jul. 3, 2015, 2 pages.
Wikipedia: "Object hyperlinking", Internet Article, Sep. 22, 2014, 4 pages.
Oliver Drobnrk: "Barcodes with iOS—Bringing together the digital and physical worlds", Feb. 19, 2015, 248 pages.
(Continued)

*Primary Examiner* — Yogesh C Garg
(74) *Attorney, Agent, or Firm* — Reinhart Boerner Van Deuren P.C.

(57) ABSTRACT

A method including: receiving information from which it follows that a position of a shipment relative to a predetermined station at which the shipment respectively arrives during a delivery process for the shipment has changed, wherein the shipment contains a good to be paid for; and initiating a process in which a person is provided with the opportunity to make a payment for the good, in response to the receipt of the information. Also a method including: generating information from which it follows that a position of a shipment relative to a predetermined station at which the shipment respectively arrives during a delivery process for the shipment has changed, wherein the shipment contains a good to be paid for; and outputting the information to an apparatus that is configured to initiate a process in which a person is provided with the opportunity to make a payment for the good.

25 Claims, 5 Drawing Sheets

(51) Int. Cl.
*G06Q 20/12* (2012.01)
*G06Q 20/32* (2012.01)

(58) Field of Classification Search
USPC .... 705/26.1, 26.81, 39, 40, 330–338, 26.41;
340/539.13
See application file for complete search history.

(56) References Cited

U.S. PATENT DOCUMENTS

| | | | |
|---|---|---|---|
| 2001/0054025 A1 | 12/2001 | Adams et al. | |
| 2002/0010606 A1* | 1/2002 | Soga | G06Q 10/063 705/7.12 |
| 2002/0111914 A1 | 8/2002 | Terada et al. | |
| 2002/0138197 A1* | 9/2002 | Schramke | G06Q 10/047 701/469 |
| 2003/0022676 A1* | 1/2003 | Nakamoto | G01C 21/20 455/456.1 |
| 2003/0231112 A1 | 12/2003 | Raju | |
| 2005/0083176 A1* | 4/2005 | Yamada | G06Q 10/08 340/5.73 |
| 2007/0262861 A1* | 11/2007 | Anderson | G06Q 10/025 340/539.13 |
| 2011/0087887 A1 | 4/2011 | Luft et al. | |
| 2012/0246077 A1 | 9/2012 | Skaaksrud et al. | |
| 2013/0063279 A1* | 3/2013 | Hamm | G06Q 10/08 340/870.02 |
| 2013/0124288 A1* | 5/2013 | Carter | G06Q 30/0222 705/14.23 |
| 2013/0317929 A1* | 11/2013 | Schnorf | G06Q 10/08 705/26.3 |
| 2016/0196528 A1* | 7/2016 | Lemmon | H04W 4/025 705/332 |
| 2016/0217399 A1* | 7/2016 | Roelofs | G06Q 10/0635 |
| 2017/0061372 A1* | 3/2017 | Agarwal | G06Q 10/0835 |
| 2018/0285806 A1* | 10/2018 | Scofield | G06Q 10/08 |

FOREIGN PATENT DOCUMENTS

| | | |
|---|---|---|
| CN | 103703480 A | 4/2014 |
| CN | 104331937 A | 2/2015 |
| CN | 104484780 A | 4/2015 |
| DE | 20 2011 101 134 U1 | 9/2011 |
| DE | 10 2013 015 521 A1 | 3/2014 |
| EP | 3 166 060 A1 | 5/2017 |
| WO | WO 2015/065763 A1 | 5/2015 |

OTHER PUBLICATIONS

Vedat Coskun et al: "Near Field Communication (NFC): From Theory to Practice", Feb. 13, 2012, 262 pages.
Wikipedia: "Sendungsverfolgung", Internet Article, Jun. 15, 2015, 8 pages.
Wikipedia: "Package tracking", Internet Article, Oct. 7, 2014, 4 pages.
Rainer Gievers: "Das Praxisbuch Online-Shopping fur Einsteiger", Oct. 14, 2015, Gievers, 124 pages.
Peter Stavroulakis et al: "Handbook of information and communication security", Apr. 4, 2010, Springer, DE, 120 pages.
Parcelforce: "Customs charges on non-eu goods—A simple guide", Internet Article, Nov. 19, 2013, 8 pages.
Die Schweizerische Post: "Auf Ihre Wunsche abgestimmt—Angebote und Preise fur Geschaftskunden", Internet Article, Mar. 19, 2012, 78 pages.
Wikipedia, "Paketzentrum," Internet Article, Sep. 14, 2015, 17 pages.
Oliver Drobnik, "Barcodes with iOS, Bringing Together the Digital and Physical Worlds," Book, Feb. 19, 2015, 113 pages, Manning Publications Co., Shelter Island, NY.
Wikipedia, "Mobile Device," Internet Article, Oct. 20, 2015, 5 pages.
Wikipedia, "Packstation," Internet Article, Oct. 24, 2015, 20 pages.
Wikipedia, "Handsfree," Internet Article, Sep. 21, 2015, 3 pages.
Wikipedia, "Mobile Payment," Internet Article, Nov. 1, 2015, 9 pages.
Wikipedia, "Mobile Ticketing," Internet Article, Oct. 29, 2015, 4 pages.
Wikipedia, "Location-Based Service," Internet Article, Oct. 3, 2015, 11 pages.
Hendrik Härter, "E-Paper—Cleveres Display ersetzt das Türschild," Elektronik Praxis, Internet Article, Jan. 21, 2014, 2 pages.
Hossein Bidgoli, "The Handbook of Technology Management: Supply Chain Management, Marketing and Advertising, and Global Management (vol. 2)", Jan. 12, 2010, 4 pages.
Norbert Bartneck et al., Siemens, "Optimizing Processes with RFID and Auto ID", Apr. 20, 2009, 141 pages, Publicis.
Oliver Drobnik: "Barcodes with iOS—Bringing together the digital and physical worlds", Feb. 19, 2015, 248 pages.
Peter Stavroulakis et al: "Handbook of information and communication security", Apr. 8, 2010, Springer, DE, 120 pages.

* cited by examiner

EARLY INITIATION OF THE PAYMENT PROCESS FOR CASH-ON-DELIVERY SHIPMENTS

CROSS-REFERENCE TO RELATED PATENT APPLICATION

This patent application claims priority to German Application No. 10 2015 118 999.2, filed Nov. 5, 2015, the entire teachings and disclosure of which are incorporated herein by reference thereto.

FIELD

Exemplary embodiments of the invention relate to the initiation of a process in which a person is provided with the opportunity to make a payment for a good that a shipment contains, particularly before delivery of the shipment.

BACKGROUND

Besides payment methods such as credit card payment, payment on account, by transfer or by direct debit, cash on delivery is enjoying growing popularity in the mail-order trade. Payment by cash on delivery involves ordered goods being paid for only at the time at which the shipment containing the goods are delivered to the recipient. In the present specification, a recipient of a shipment is understood to mean a person for whom the shipment is intended. This may be particularly the purchaser or the goods and/or the addressee of the shipment (who has been specified in a delivery address for the shipment, for example, or otherwise associated with the shipment, for example by means of a database). The payment is made at the time of delivery of the shipment, by the recipient to the delivery agent, who hands over the shipment with the goods to the recipient only when the payment is complete, and then later forwards the received payment to the sender of the goods.

Payment by cash on delivery is advantageous for the purchaser of a good insofar as the payment does not need to be made until the shipment is actually received, that is to say that the risk of a good not being received despite payment having been made can be eliminated. From the point of view of the vendor, there is the advantage, in comparison with payment variants such as payment on account or direct debit, that the risk of a delivered good not being paid for or a direct debit therefor being cancelled by the purchaser does not exist.

SUMMARY OF SOME EXEMPLARY EMBODIMENTS OF THE INVENTION

In the case of payment by cash on delivery, payment collection by the delivery agent at the time of delivery is time consuming and complicated both for the delivery agent and for the recipient of the shipment. Furthermore, the shipment can be delivered only if the recipient is at home or the delivery agent finds another person, for example a neighbor of the recipient, who, however, not only has to be prepared to accept the shipment but also needs to be informed by the recipient of whether he actually wishes to receive the shipment, and must then accordingly make the payment to the delivery agent instead of the recipient.

When shipments that are delivered to a compartment in order to be taken out by the recipient are paid for by cash on delivery, the further advantage arises that the unit (e.g. a package station) in which the compartment is accommodated needs to have either personnel or appropriate technical equipment for accepting payments so that the recipient can pay for the good when it is collected from the compartment.

It is therefore an object of the present invention, inter alia, to overcome the disadvantage of the known cash on delivery method. In particular, technical options need to be identified for how the payment process can be initiated and performed before actual delivery to an delivery address (or collection from a compartment), so that said process is already complete at the time of delivery (or collection of the good from a compartment).

According to a first exemplary aspect of the invention, a method is disclosed that comprises the following:
 receiving first information from which it follows that a position of a shipment relative to a predetermined station from a succession of stations at which the shipment respectively arrives during a delivery process for the shipment has changed or that a change of the position of the shipment relative to the predetermined station is to take place, wherein the shipment contains a good that has not yet been paid for; and
 initiating a process in which a person is provided with the opportunity to make a payment for the good, in response to the receipt of the first information.

According to a second exemplary aspect of the invention, a method is disclosed that comprises the following:
 generating first information from which it follows that a position of a shipment relative to a predetermined station from a succession of stations at which the shipment respectively arrives during a delivery process for the shipment has changed or that a change of the position of the shipment relative to the predetermined station is to take place, wherein the shipment contains a good that has not yet been paid for; and
 outputting the first information to an apparatus that is configured to initiate, in response to receipt of the first information, a process in which a person is provided with the opportunity to make a payment for the good.

For each of the methods according to the first and second aspects of the invention, an apparatus is furthermore disclosed (and subsequently referred to as apparatus according to the first or second aspect of the invention) that is configured to perform and/or control the respective method or comprises respective means for performing and/or controlling the steps of the respective method. In this case, it is possible either for all the steps of the respective method to be controlled, or for all the steps of the respective method to be performed, or for one or more steps to be controlled and one or more steps to be performed. One or more of the means can also be performed and/or controlled by the same unit. By way of example, one or more of the means may be formed by one or more processors.

For each of the methods according to the first and second aspects of the invention, apparatus is furthermore disclosed (and subsequently referred to as apparatus according to the first or second aspect of the invention) that comprises at least one processor and at least one memory containing program code, the memory and the program code configured to, with the at least one processor, cause an apparatus (for example the apparatus having the processor and the memory) to perform and/or control at least the respective method. In this case, it is possible either for all the steps of the respective method to be controlled, or for all the steps of the respective method to be performed, or for one or more steps to be controlled and one or more steps to be performed.

The apparatus according to the first aspect of the invention may be a server, for example. The server may be integrated in the back end of a delivery company, for example. The apparatus according to the second aspect of the invention may be a capture and/or communication unit, for example, that is installed at the predetermined station or is used by an operator (particularly a delivery agent) at the predetermined station.

For each of the methods according to the first and second aspects of the invention, a system is furthermore disclosed (and subsequently referred to a system according to the first or second aspect of the invention) that comprises one or more apparatuses that are configured to perform and/or control the respective method or have means for performing and/or controlling the steps of the respective method. In this case, it is possible either for all the steps of the respective method to be controlled, or for all the steps of the respective method to be performed, or for one or more steps to be controlled and one or more steps to be performed.

Further, a system is disclosed that comprises at least an apparatus according to the first aspect of the invention and an apparatus according to the second aspect of the invention.

For each of the methods according to the first and second aspects of the invention, a computer program is furthermore disclosed (and subsequently referred to as computer program according to the first or second aspect of the invention) that comprises program instructions that cause a processor to perform and/or control the respective method when the computer program runs on the processor. In this specification, a processor is intended to be understood to mean control units, microprocessors, microcontrol units such as microcontrollers, digital signal processors (DSP), application-specific integrated circuits (ASICs) or field programmable gate arrays (FPGAs), inter alia. In this case, it is possible either for all the steps of the respective method to be controlled, or for all the steps of the respective method to be performed, or for one or more steps to be controlled and one or more steps to be performed. By way of example, the computer program may be distributable via a network such as the internet, a telephone or mobile radio network and/or a local area network, for example. The computer program may at least in part be software and/or firmware of a processor. It may equally be implemented at least in part as hardware. By way of example, the computer program may be stored on a computer-readable storage medium, e.g. a magnetic, electric, electromagnetic, optical and/or other kind of storage medium. By way of example, the storage medium may be part of the processor, for example a (non-volatile or volatile) program memory of the processor or a part thereof. By way of example, the storage medium is substantive, that is to say tangible, and/or nontransitory.

Exemplary embodiments of all aspects of the present invention have some or all of the properties described below.

A process in which a person, particularly a purchaser of a good and/or a recipient of a shipment that contains a good that has not yet been paid for, is provided with the opportunity to pay for the good is initiated in response to received first information. By way of example, the shipment is a letter (particularly a letter with a good that it contains, e.g. a book), a small package or a parcel. It follows from the first information that a position of a shipment relative to a predetermined station of a succession of stations at which the shipment arrives during a delivery process for the shipment has changed or that a change of the position relative to the predetermined station is to take place. By way of example, it follows from the first information that the shipment has reached or almost reached or left the predetermined station or is to be removed from this station. The last station in the succession of stations may be the station specified by the delivery address for the shipment, for example, which may be, by way of example, an address of the residence or place of business of the recipient of the shipment, the address of a compartment (e.g. a package station) or a storage site (e.g. a parcel shop, a Toto lottery kiosk, a retail branch, a filling station, a restaurant, etc.) from which the shipment is collectable by the recipient, for example, or the address of a store at which the shipment is temporally stored and can then be delivered to the recipient by a service provider, particularly in accordance with appointed times desired by said recipient. The delivery process may be complete, particularly at least from the point of view of the delivery company that is responsible for delivery to the delivery address, particularly where the shipment is delivered to the delivery address.

Examples of the predetermined station are a sorting station through which shipments pass during the delivery process, for example, or a compartment (for example in a package station) or a storage site (e.g. a parcel shop) to which a shipment is delivered for collection by the recipient, or a store for shipments to which a shipment is delivered by a delivery agent for later delivery to the recipient—particularly by a service provider other than the service provider for whom the delivery agent works, particularly in accordance with a time or period communicated by the recipient—, or the address (particularly the residence or the place of business of the person, as indicated in the delivery address, for example) to which the shipment is to be delivered.

Advantageously, the change of position that has taken place or is imminent for the shipment relative to the predetermined station is thus used to initiate the process in which the person can pay for the good. These relative changes of position that have taken place or are imminent can be captured using sensors or processors, for example, particularly at the predetermined stations (particularly by the apparatus according to the second aspect of the invention, or an apparatus operatively connected thereto, the apparatus according to the second aspect of the invention then being installed on the predetermined station, for example, or being used at that location by operating personnel (e.g. a delivery agent)).

First information from which relative changes of position of this kind have taken place or are imminent follow, that is to say that said relative changes of position are explicitly expressed by the first information, for example, or are derivable from the first information, is generated and output in accordance with the second aspect of the invention so as then to be received in accordance with the first aspect of the invention and used as an initiator of the process in which the person can pay for the good.

The first information may comprise information that characterizes the shipment explicitly as a shipment that contains a shipment that has not yet been paid for, or may contain no such explicit information. In the latter case, an identifier that the first information contains for the shipment can be used as an index to a database, for example, that then provides information about whether or not the shipment is a shipment that contains a good that has not yet been paid for.

By way of example, the first information may comprise an identifier for the shipment. It may additionally comprise information pertaining to an apparatus that has generated the first information and/or that has been used to capture data of a shipment on which the first information is based at least in part, for example an identifier or the location of the apparatus. The first information may additionally or alternatively comprise information (e.g. an identifier or a location) pertaining to a station that is associated with the apparatus in the succession of stations. The first information may additionally or alternatively comprise information pertaining to the time of generation of the first information and/or pertaining to the time of capture of the data of the shipment.

If the predetermined station is not the last station in the succession of stations, then the process in which the person can pay for the good is advantageously initiated early, for example, so that the payment is already complete at the time of delivery of the good and the delivery agent merely needs to be informed that the good has been paid for, for example, but in particular no longer has to collect payment himself. If the predetermined station is the last station in the succession of stations (for example the address to which the shipment is to be delivered), then the first information can state that it is immediately imminent that this last station will be reached, for example because it has been established that the distance of the delivery agent for the shipment from the last station has dropped below a predefined value, or that the shipment has reached the predetermined station. If the predetermined station is the residence or place of business of the person, then the person can thus make payment for the good in good time before the delivery agent arrives. If the predetermined station is a compartment, then a person can make the payment for the good particularly before the shipment is taken out of the compartment, which may be permitted only on condition that the payment has been made, for example.

The process in which the person is provided with the opportunity to make the payment for the good involves communication with the person, particularly via an application on a device (for example a computer or Smartphone) of the person, or via an interactive webpage, for example. By way of example, it is possible to obtain the consent of the person to make the payment (for example even conceding a time for consideration within which the person can decide whether the payment should be made) and, in the event of consent being obtained, to make the payment for the person, for example on the basis of stored payment information of the person. Alternatively, the person can be assisted in making the payment. In exemplary embodiments of the invention, the person has declared himself prepared to be contactable as part of the process in which the person is provided with the opportunity to make the payment for the good.

Payment is based particularly on an online payment method, that is to say particularly not on cash payment. By way of example, the (online) payment method can be handled via a device of the person without the person having to visit an institution, particularly a bank, and without the person having to fill in a physical form and send it to an institution, particularly a bank. By way of example, the (online) payment method is not based on the use of a portable terminal of the delivery agent to which the person indicates payment information and which is then used to handle the payment (if need be in interaction with a server, particularly a bank, a credit card company or a payment service provider).

The payment made for the good by the person may be a prerequisite for handover of the shipment to the recipient by the delivery agent, for the shipment to be released from a compartment or for the shipment to be delivered to a storage site (e.g. a retail branch, a filling station, a restaurant, etc.) from which the shipment is collectable by the recipient, for example By way of example, the payment for the good may be addressed to the sender of the shipment or the vendor of the good, that is to say can be made to an account of the sender or vendor, or may alternatively be addressed to a trustee or a bill collection service provider that then forwards the payment made to it to the sender or vendor.

In exemplary embodiments of the present invention, the process in which a person can pay for the good is thus initiated (in particular automatically) on the basis of events, determined by means of sensors or processors, that relate to a change of position that has taken place or is imminent for the shipment containing the good relative to a predetermined station, preferably before the actual delivery of the shipment, collection of the shipment from a (in particular locked) compartment to which the shipment has been delivered or delivery of the shipment to a storage site from which the shipment is collectable by the recipient.

Ideally, payment has then already been made at the time of delivery of a shipment or collection of the shipment from a compartment, so that, by way of example, no bill collection by the delivery agent or—in the case of a compartment—no personnel and no technical equipment to allow payment at the location of the compartment have to be necessary. Furthermore, after payment has been made, the delivery agent has more degrees of freedom for delivery of the shipment. If the recipient is not found, for example, then the shipment can be left with a neighbor, since payment has been made, of course.

At the time at which the payment for the good is made, the person who makes the payment is at least certain that the good has actually been handed over to the delivery company by the sender and is in the delivery process. This is advantageous particularly when the person has greater confidence in the delivery company than in the sender, which may be a different person or entity for every shipment, of course.

In one exemplary embodiment of all aspects of the invention, it follows from the first information that the shipment has reached the predetermined station, and the predetermined station is the last station in the succession of stations, particularly the address to which the shipment is to be delivered. By way of example, the address may be associated with the shipment, for example marked thereon in coded or uncoded form. By way of example, the address can denote the residence or place of business of the person, or the location of a compartment (e.g. a package station) or a storage site (e.g. a parcel shop, a retail branch, a filling station, a restaurant, etc.), or the location of a store (at which the shipment is temporarily stored, for example, and then delivered to the recipient by a service provider in accordance with appointed times desired by the recipient). The first information can be generated and/or received, for example, immediately after a capture (e.g. by a sensor or processor) or establishment (e.g. by a person) indicating that the shipment has reached the predetermined station. The capture may be part of the method according to the second aspect of the invention, for example.

The first information is then generated in response to a capture of data of the shipment, for example (which capture is likewise part of the method according to the second aspect of the invention, for example), the capture being effected at the predetermined station using a device of a delivery agent for the shipment (which device is an apparatus according to the second aspect of the invention, for example). By way of example, the data of the shipment comprise at least one identifier for the shipment or information that can be used for identifying the shipment and/or the recipient of the shipment and/or payment information of the person. By way of example, the data of the shipment are printed on the shipment, e.g. in coded (e.g. as a one-dimensional or two-dimensional barcode) or uncoded form, or are stored in an electronic memory element associated with the shipment. By way of example, the device of the delivery agent may be a mobile device of the delivery agent, for example a hand-held scanner. By way of example, the device is configured for optical capture of the data of the shipment. By way of example, the device is configured to transmit the captured data or the first information, which is generated by the device on the basis of at least some of the captured data, for example, to an apparatus that performs the method according to the first aspect of the invention.

Capture of the data is performed by the delivery agent at the time of the delivery, for example. By way of example, capture of the data is performed by the delivery agent as part of a process that is used to prove that the delivery agent has duly delivered the shipment. This process also involves a signature of the recipient being captured as an acknowledgement, for example. The data of the shipment that are captured in this process anyway, or at least some of said data, can advantageously be used, according to the invention, to initiate the process in which the person can make the payment for the good. In this case, the payment is handled in this process preferably via an online payment method, which means that there is no longer a need for bill collection by the delivery agent.

The process in which the person is provided with the opportunity to pay for the good is then initiated, that is to say particularly on the basis of the capture of data of the shipment, by a device of the delivery agent, particularly at the time of the delivery. In this case, the delivery can be made directly to the recipient of the shipment, or to a compartment (e.g. a package station) from which the shipment can then be collected, or to a storage site from which the shipment can be collected by the recipient, or to a store from which the shipment is then delivered—particularly by a service provider other than the service provider for whom the delivery agent works—to the recipient, particularly in accordance with ideas of the recipient that are communicated to the service provider about appointed times.

In one exemplary embodiment of all aspects of the invention, it follows from the first information that the shipment has almost reached the predetermined station, and the predetermined station is the last station in a succession of stations, particularly the address to which the shipment is to be delivered. By way of example, the address may be associated with the shipment, for example marked thereon in coded or uncoded form. By way of example, the address may be the residence or place of business of the person, or the location of a compartment (e.g. a package station), or the location of a storage site (e.g. a parcel shop), or the location of a store (at which the shipment is temporarily stored, for example, and then delivered to the recipient by a service provider in accordance with appointed times desired by the recipient). By way of example, the first information can be generated and/or received immediately after a capture (e.g. by a sensor or processor) or establishment (e.g. by a person) indicating that the shipment has almost reached the predetermined station. By way of example, the capture may be part of the method according to the second aspect of the invention.

By way of example, the shipment has almost reached the predetermined station when the shipment has entered a predetermined area that contains the predetermined station or when the distance between the shipment and the predetermined station has dropped below a predefined value. This can be captured by an apparatus (in particular automatically), for example, particularly by an apparatus according to the second aspect of the invention. By way of example, the first information is generated and/or received when an apparatus (for example a sensor or a processor) has established the like.

The first information is thus generated, for example, in response to a capture of the entry of the shipment or of a delivery agent for the shipment into a predetermined area containing the predetermined station or in response to a capture indicating that the distance of the shipment or of a delivery agent for the shipment from the predetermined station has dropped below a predetermined value.

The entry of the delivery agent for the shipment into the predetermined area or the drop below the predetermined value by the distance of the delivery agent from the predetermined station is captured particularly by a device associated with the delivery agent, particularly a portable device of the delivery agent (for example a hand-held scanner or a cell phone) or a device that is at least temporarily installed in a vehicle of the delivery agent. These devices are each examples of an apparatus according to the second aspect of the invention.

The device determines its current position, for example at regular or irregular intervals, and computes the respective distance from the predetermined station. When this distance falls below the predetermined value, it is possible for the first information to be generated, for example, and transmitted to an apparatus that performs the method according to the first aspect of the invention. Alternatively, the device can establish, upon receiving a (in particular limited-range) radio signal that is sent by an apparatus situated at the location of the predetermined station, that the delivery agent for the shipment has entered the predetermined area or that the distance of the delivery agent from the predetermined station has dropped below the predetermined value. By way of example, the apparatus may be part of a letter and/or parcel box installation having one or more compartments for receiving shipments even when the recipient is absent, of a building automation or control system, of an entry control system for buildings or vehicles or of a door communication system, or may be operatively connected (wirelessly or by wire) to such an installation or such a system. By way of example, the radio signal can contain information about the predetermined station (for example an address of the predetermined station and/or an identifier), on the basis of which the device of the delivery agent can establish that the radio signal comes from the predetermined station. The radio signal is sent at regular intervals, for example. Additionally or alternatively, the radio signal can be sent when the apparatus recognizes that the device of the delivery agent is approaching. By way of example, the level of the radio signal is chosen such that the radio signal can be received and evaluated by the device of the recipient at least (or exclusively) in a predetermined area.

By way of example, the first information can contain at least one identifier for the shipment or information that can be used for identifying the shipment and/or the recipient of the shipment and/or payment information of the person. Additionally, the first information can contain information about the time at which it has been established that the distance has fallen below the predetermined value, for example.

In one exemplary embodiment of all aspects of the invention, it follows from the first information that the shipment has reached or left the predetermined station, and the predetermined station is not the last station in the succession of stations and is particularly not the address to which the shipment is to be delivered. By way of example, the address may be associated with the shipment, for example marked thereon in coded or uncoded form. By way of example, the address can denote the residence or place of business of the person, or the location of a compartment (e.g. a package station), or the location of a storage site (e.g. a parcel shop), or the location of a store (at which the shipment is temporarily stored, for example, and then delivered to the recipient by a service provider (which is different from the service provider for whom the delivery agent works, for example) in accordance with appointment times desired by the recipient. By way of example, the first information can be generated and/or received immediately after a capture (e.g. by a sensor or a processor) indicating that the shipment has reached or left the predetermined station. By way of example, the capture may be part of the method according to the second aspect of the invention. Since the predetermined station is not the last station in the succession of stations, there still remains, prior to delivery, time for the person to make the payment for the good within the context of the by now initiated process in which the person is provided with the opportunity to pay for the good. By way of example, the predetermined station may be a sorting station at which the shipment is sorted together with multiple shipments on the basis of the delivery address and, if need be, the need for haste.

In one exemplary embodiment of all aspects of the invention, it follows from the first information that the shipment has reached or left the predetermined station, and the predetermined station is a sorting station at which the shipment is sorted during the delivery process together with other shipments. By way of example, the first information can be generated and/or received immediately after a capture (e.g. by a sensor or a processor) indicating that the shipment has reached or left the predetermined station. By way of example, the capture of the data may likewise be part of the method according to the second aspect of the invention. The shipment is sorted at the sorting station, for example together with the other shipments, on the basis of the shipment address and, if need be, the need for haste.

In the two preceding exemplary embodiments, the first information is generated in response to a capture of data of the shipment, for example, the capture being effected automatically at the predetermined station. By way of example, the data of the shipment comprise an identifier for the shipment or information that can be used to identify the shipment and/or a recipient of the shipment and/or payment information of the person. The data of the shipment are captured at least in part at the predetermined station in order to be able to track the shipments. According to the invention, at least some of the captured data are used to initiate the process in which the person is provided with the opportunity to pay for the good.

In one exemplary embodiment of all aspects of the invention, it follows from the first information that the shipment is to be removed from the predetermined station, and the predetermined station comprises a locked space into which the shipment has been placed particularly for collection by a recipient of the shipment. By way of example, the locked space is a compartment (e.g. a locker compartment), particularly of a package station to which the shipment has been delivered for collection by the recipient.

By way of example, the first information can be generated in this case in response to a capture of a predetermined step (e.g. a step that is used to start the process, or that a person has used to successfully authenticate himself) of a process in which a person gains access to the locked space to take out the shipment. By way of example, the predetermined step is captured by an apparatus associated with the locked space, particularly an apparatus that controls access to the locked space.

In one exemplary embodiment of the first aspect of the invention, the method further comprises outputting second information in response to payment for the good being regarded as having been made, particularly to the delivery agent for the shipment or to a device of the delivery agent for the shipment or to the recipient of the shipment or to a device of the recipient of the shipment. By way of example, the shipment is delivered (directly to the recipient, or to a compartment, to a storage site or to a store) only if the delivery agent or the device of the delivery agent has received the second information beforehand.

By way of example, it follows from the second information that the payment for the good is regarded as having been made. Receipt of the second information by the delivery agent or the device of said delivery agent may be a necessary prerequisite for the delivery agent to hand over the shipment to the recipient, for example. Alternatively, receipt of the second information by the delivery agent or the device of said delivery agent and a check on the second information that returns a positive result, for example, may be a necessary prerequisite for the delivery agent to transfer the shipment to the recipient. By way of example, the check can involve checking whether the second information fits the shipment and/or reflects payment of the correct sum and/or is authentic and/or has integrity. By way of example, the check can involve checking whether the second information matches third information that is accessible to the delivery agent or the device of said delivery agent at least at the time of the check. By way of example, the second information may comprise an identifier for the shipment or may have been generated using at least part of the identifier. Additionally or alternatively, the second information may comprise information about the level of a sum paid for the good, for example, or may have been generated using at least some of this information.

The second information is output to the recipient of the shipment or to a device of the recipient of the shipment, for example, wherein the second information or information derived therefrom is used as evidence of the payment that is regarded as having been made for the good to the delivery agent or to a device of the delivery agent, for example.

When the shipment is delivered directly to the recipient, the second information can then be communicated to the delivery agent by the recipient, or transmitted to the device of the delivery agent by the device of the recipient, at the time of the delivery, for example.

In one exemplary embodiment of all aspects of the invention, the process in which the person is provided with the opportunity to pay for the good comprises at least the following:

outputting an inquiry as to whether a person, who is particularly the recipient of the shipment and/or the purchaser of the good, wishes to pay for the good, to the person;

if it follows from a reaction by the person to the inquiry that the person wishes to pay for the good, performing payment for the good for the person or assisting the person in paying for the good.

A communication address for outputting the inquiry to the person is determined at least on the basis of information from the received first information, for example. By way of example, information from the first information is taken as a basis for determining the person, and then the communication address that is required for outputting the enquiry is determined for this person from a database.

By way of example, the performing payment for the good for the person can be effected at least on the basis of stored payment information of the person, for example credit card information or bank details information.

By way of example, the assisting the person in paying for the good can be performed by a software application (for example an app) on a device of the person or using a, in particular interactive, web page.

By way of example, the payment for the good can be performed in one of the following ways:
- payment on the basis of credit card information;
- payment by direct debit;
- payment by transfer;
- payment by money card;
- payment via a payment system provider at which the person has an account;
- payment by prepaid credit card or prepaid code; or
- payment by cell phone invoice.

In one exemplary embodiment of all aspects of the invention, the payment for the good is made to a second entity, which is different from a first entity, which is the vendor of the good and/or the sender of the shipment, and particularly acts as a bill collection service provider. Alternatively, the payment for the good is made to the first entity.

By way of example, the second entity is part of a company that performs at least part of the delivery process or is economically associated with such a company.

The embodiments and exemplary refinements of all aspects of the present invention that are described above, and which are initially fundamentally independent, are also intended to be understood as disclosed in all combinations with one another.

Further advantageous exemplary refinements of the invention can be found in the detailed description of a few exemplary embodiments of the present invention below, particularly in conjunction with the figures. However, the figures accompanying the application are intended to be used only for the purpose of clarification, but not to determine the scope of protection of the invention. The accompanying drawings are not necessarily to scale and are intended merely to reflect the general concept of the present invention by way of example. In particular, features that are contained in the figures are in no way intended to be regarded as a necessary part of the present invention.

DETAILED DESCRIPTION OF A FEW EXEMPLARY EMBODIMENTS OF THE INVENTION

Figure 1:
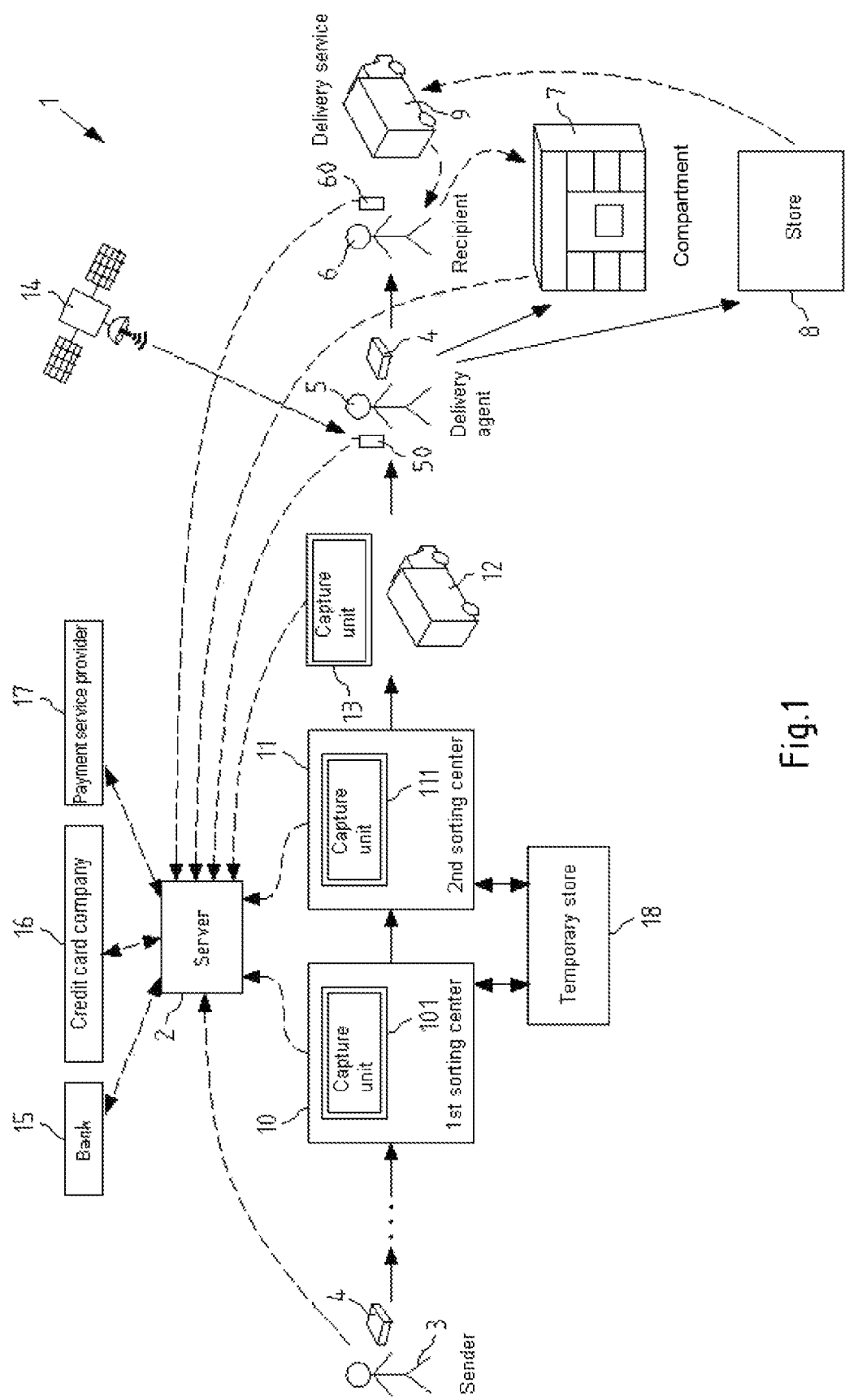
FIG. 1 shows a schematic illustration of an exemplary embodiment of a system according to the present invention.

FIG. 1 is a schematic illustration of an exemplary embodiment of a system 1 according to the present invention.

The system 1 uses solid arrows to show the path for a shipment 4 along different stations in the delivery chain, and uses dashed arrows to show the flow of information between the components of the system 1. In this case, the flow of information is intended to be understood particularly in logical fashion, that is to say can take place via physical intermediate elements such as relays or routers, for example, particularly in the case of connections that are wireless at least in sections.

A shipment 4, which may be a letter (particularly a letter with a good that it contains, e.g. a book), a small package or a parcel, for example, is handed over by a sender 3, which may also be the vendor of a good that the shipment 4 contains, for example, but does not necessarily have to be, to a delivery company for dispatch. For such dispatch tasks, the delivery company maintains the first sorting center 10, the second sorting center 11, the temporary store 18, delivery vehicles 12, delivery agents 5 and possibly compartments 7 (e.g. in the form of a package station) or storage site (e.g. a parcel shop, not shown), inter alia. The server 2 is also associated with the delivery company.

The specific way in which the shipment 4 is surrendered by the sender 3 is not shown in detail in FIG. 1. By way of example, the sender 3 surrenders the shipment 4 to a branch of the delivery company, from which it is then forwarded to the first sorting center 10. However, the center 3 can also deliver the shipment 4 directly to the first sorting center 10, for example when there are large numbers of shipments 4 arising on a daily basis, as is the case with online merchants.

At the first sorting center 10, which, by way of example, may be one of many first sorting centers, for example a cargo center for Deutsche Post AG, the shipment 4 is sorted together with other shipments, particularly on the basis of the delivery address that is present on the shipment 4. Shipments that need to be delivered in the same region are then transported to an appropriate one of many second sorting centers 11. By way of example, second sorting centers 11 correspond to the delivery bases of Deutsche Post AG. At the second sorting center 11, the shipments are distributed to different delivery agents 5 and accordingly loaded onto the respective vehicles 12 of the delivery agents. Each delivery agent 5 then delivers his associated shipments 4 to the delivery address that is present on the shipment. By way of example, the delivery address may denote an address of the recipient 6, and then be delivered directly to the recipient 6. Alternatively, the delivery address may also denote the address of a compartment (e.g. a package station) to which the shipment 4 is delivered and can then be collected by the recipient 6 (or another person who has the appropriate authorization). Alternatively, the delivery address may also denote the address of a storage site (e.g. a parcel shop, a retail branch, a filling station or a restaurant, etc.) to which the shipment 4 is delivered and can then be collected by the recipient 6 (or another person who has the appropriate authorization) at that location. As a further alternative, the delivery address may also denote the address of a store to which a recipient 6 can have one or more shipments 4 delivered. The recipient 6 can then arrange a desired appointed time for delivery of the shipments 4 from the store 8 to the recipient 6, for example including in the evening or at the weekend, with a delivery service 9, which also maintains the store 8, for example.

According to exemplary embodiments of the present invention, the shipment 4 is surrendered by the sender 3 as what is known as a cash-on-delivery shipment. A good that the shipment 4 contains, for example a good ordered from an online merchant 3 by a person, for example the recipient 6, has thus not yet been paid for at the time at which the shipment 4 is surrendered for dispatch. In exemplary embodiments of the invention, this payment for the good is made by a person, who is the purchaser of the good and/or the recipient 6 of the shipment 4, for example, at the time of delivery of the shipment 4 or preferably beforehand. In particular, the payment is made not by virtue of the delivery agent 5 collecting the sum from the recipient 6 in cash, but rather by virtue of the payment being handled electronically, particularly between the recipient 6 or another person and the server 2. When the shipment 4 is surrendered, the sender 3 informs the server 2 that the shipment is a cash-on-delivery shipment, for example via a web page that the server 2 provides for this purpose or another communication interface (for example via an application programming interface (API)). Right from this time, the shipment may have an associated identifier by means of which the shipment 4 is (in particular explicitly) identifiable. The server can then be used to store for the identifier, for example in a database, that the associated shipment 4 is a cash-on-delivery shipment.

In exemplary embodiments of the invention, the server 2 initiates a process in which a person is provided with the opportunity to pay for the good. This process can involve an interaction taking place between the server 2 and further servers of a bank 15, of a credit card company 16 or of a payment service provider 17. This process already allows distinct speeding-up of the payment in comparison with collection of a cash sum performed by the delivery agent 5. Furthermore, this process is initiated automatically in response to first information, however, from which it follows that a relative change of position for the shipment in relation to a predetermined station has taken place or is imminent.

Figure 3:
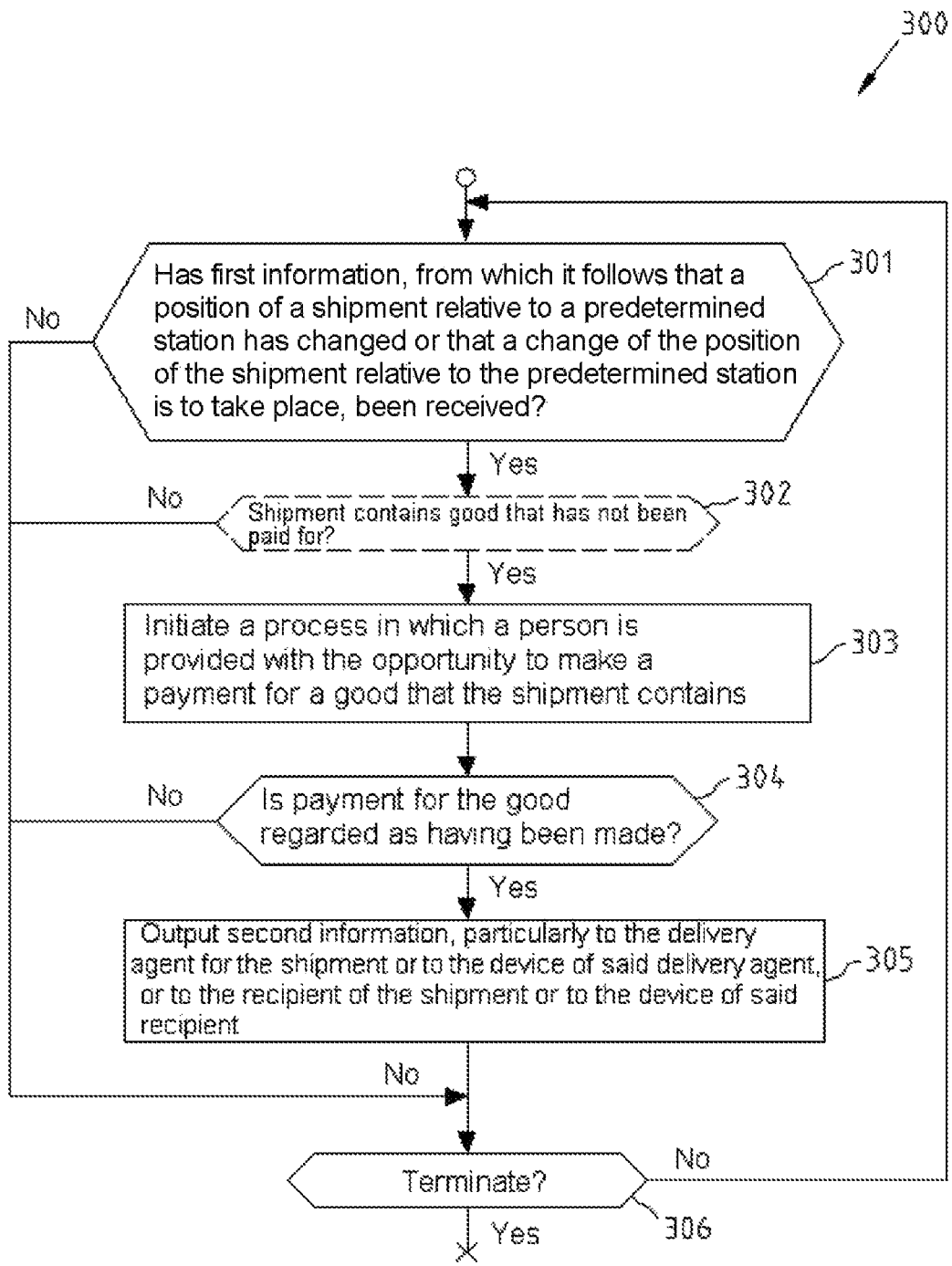
FIG. 3 shows a flow chart for an exemplary embodiment of a method according to the first aspect of the present invention.

In this regard, the server 2 (or a processor of the server) performs the method 300 of FIG. 3, for example. This involves a first step 301 being used to check whether first information from which it follows that a position of a shipment 4 relative to a predetermined station has changed or that a change of the position of the shipment 4 relative to the predetermined station is to take place has been received.

If this is not the case, then the method skips to step 306. Otherwise, step 303 is used to initiate a process in which a person is provided with the opportunity to make a payment for the good. Step 302, located between step 301 and step 303, is optional and will be explained later.

Step 304 is then used to check whether the payment of the good is regarded as having been made. By way of example, the payment for the good is regarded as having been made if a payment transaction has been completed without an error message and/or confirmation of the payment having been made has been received, for example from a server of a bank 15, of a credit card company 16 or of a payment service provider 17.

If this is not the case, then the method skips to step 306. Otherwise, step 305 is used to output second information, particularly to the delivery agent 5 for the shipment 4 or the device 50 of said delivery agent, or to the recipient 6 of the shipment 4 or the device 60 of said recipient. By way of example, it follows from the second information that the payment for the good is regarded as having been made. Direct (e.g. from the server 2) or indirect (e.g. from the recipient 6 or the device of said recipient) receipt of the second information by the delivery agent 5 or the device 50 of said delivery agent and possibly a check on the second information that has a positive result as its outcome may be, by way of example, a necessary prerequisite for the delivery agent 5 handing over the shipment 4 to the recipient 6. By way of example, the check can involve checking whether the second information fits the shipment 4 and/or reflects payment of the correct sum and/or is authentic (that is to say comes from a trustworthy source, particularly the server 2, for example) and/or has integrity (that is to say has not been manipulated, for example).

Step 306 is used to check whether the method 300 needs to be terminated. If this is the case, then termination takes place. Otherwise, the method returns to step 301.

By way of example, the second information may merely express that the good in the shipment 4 with which the second information is explicitly or implicitly associated has been paid for. By way of example, this may suffice if the second information is transmitted from the server 2 to the device 50 of the delivery agent 5 and has been associated with the shipment 4 either already on the server 2 or on the device 50. By way of example, the second information is generated on the server 2 and then transmitted to the device 50 together with an identifier for the shipment 4 to which the second information relates. If the delivery agent 5 then calls up a data record for the shipment 4, for example and/or captures data of the shipment 4 (for example at the time of delivery), then the second information can be displayed to him, so that he is informed that the good in the shipment 4 has been paid for. By way of example, the delivery agent 5 can then count on the good having been paid for in full, for example, since the sum to be paid has been predetermined in the initiated process of step 303, for example. The authenticity and/or integrity of the second information may be ensured, or at least regarded as having a high probability of being ensured, on the basis of the communication channel and/or protocol (e.g. encrypted communication by the server 2) by means of which the second information is received, for example. Alternatively, the second information may be cryptographically signed by the server 2 (for example in the usual form by forming a hash value via the second information, encrypting the hash value, particularly using a private key that is known only to the server 2, and appending the hash to the second information), so that the authenticity and integrity can be checked on the device 50 (by recomputing the hash value, encrypting the received encrypted hash value using a public key that corresponds to the private key, and comparing the recomputed hash value with the decrypted hash value, a match between the two values being proof of integrity and authenticity).

In this variant of the use of the second information, however, it is absolutely necessary for the server 2 to be able to transmit the second information to the device 50 of the delivery agent 5, which may not be ensured, particularly in regions having poor radio coverage, and can therefore jeopardize the delivery.

By way of example, the second information can alternatively be generated in accordance with a prescribed method (for example based on an identifier for the shipment 4 and/or the level of the sum paid and/or further information), for example by the server 2, and can be output when the good has been paid for in full, for example (otherwise, the second information is not output, for example). By way of example, the method can be secret, and/or use secret information, for example a secret key. By way of example, the method or the keys can be changed at intervals. By way of example, the second information can be communicated to the person or transmitted to a device of the person (for example by means of an encrypted connection) after payment has been made. The person can then present or communicate the second information, particularly at the time of the delivery, to the delivery agent 5 (or the device of the person can transmit the second information to the device 50 of the delivery agent 5, e.g. wirelessly). The delivery agent 5 (or the device 50 of said delivery agent) can then collate the presented or communicated information (or the transmitted information) with third information, for example, that is available to the delivery agent 5 (or the device 50). By way of example, this third information may be associated with the shipment, for example encoded (but particularly so as to be capturable and decodable using a device 50 of the delivery agent 5) or in uncoded form. By way of example, the third information is contained in a barcode that is printed on the shipment 4 or a label on the shipment 4, and/or printed on the shipment 4 or a label of the shipment 4 in uncoded form. By way of example, if the third information matches the second information, the delivery agent 5 (or the device 50 of said delivery agent) can assume that the good in the shipment 4 has been paid for in full, and can therefore hand over the shipment 4 to the person who presents or communicates the second information (or whose device transmits the second information). Since the second information is generated according to a prescribed method, it is accordingly also possible for the third information to be generated according to the same prescribed method (for example based on an identifier for the shipment 4 and/or the level of the sum to be paid and/or further information), for example by the server 2. By way of example, the third information can be associated with the shipment 4, that is to say, by way of example, can be printed on the shipment 4 in coded or uncoded form or stored in a memory associated with the shipment 4 (which is secured to the shipment 4, for example), when the process in which the person is provided with the opportunity to pay for the good is initiated (see step 303 in FIG. 3).

In this variant of the use of the second information, however, it is a drawback that the association (e.g. printing or writing to a memory) of the third information with the shipment 4 can slow down processing of the shipment 4 during the delivery process and can be generally complicated.

There may therefore be alternative provision for the third information to be stored on the device 50 of the delivery agent 5, for example before or at the start of his delivery route, so that said information is retrieved on the device 50, and can be compared with presented or communicated second information at the time of delivery of a shipment 5. For this purpose, the third information is associated (for example stored as a pair) with the identifier of the shipment 4, for example. By way of example, the delivery agent 5 thus receives respective third information, with the respective associated identifier for the shipment, in a manner stored on the device 50, for all shipments 4 that contain goods that have not been paid for, before or at the start of the (for example daily) delivery route.

In a further variant, the second information can be generated such that it can be checked by the device 50 of the delivery agent 5 on presentation by a device of a person to whom the second information has been transmitted or communicated, particularly by the server 2. By way of example, the second information may contain at least an identifier for the shipment 4 and a piece of information about the level of the sum paid and also a signature for at least the identifier of the shipment 4 and the information about the level of the sum paid. The signature can be generated as has already been described above, that is to say particularly based on a secret key that is known only to the server 2. By way of example, the device 50 has the key that corresponds to the private key, and can use the signature to check whether the second information is authentic and has integrity. If this is the case, the identifier that the second information contains for the shipment 4 and the information about the level of the sum paid can be used to check whether these values correspond to the shipment that is to be delivered at present, that is to say particularly whether the level of the sum paid corresponds to the level of the payment that is required for the shipment 4 according to the information of the device 50. This information from the device may be contained in a shipment-specific data record of the device 50 that is transmitted to the device 50 of the delivery agent 5 (particularly together with data records for further shipments), for example before or at the start of his (in particular daily) delivery route, and is called up on the device 50 (particularly in a manner identified on the basis of an identifier for the shipment 4 that the captured data contain) at the time of delivery of the shipment 4, for example when data of the shipment 4 are captured using the device 50 (e.g. by scanning a barcode of the shipment 4 using the device 50). Alternatively, the information about the level of the sum paid may not be contained in the second information, and the signature may accordingly also not be formed via this information about the level of the sum paid. This may be useful, by way of example, when the second information is output exclusively when the good is regarded as having been paid for in full. The second information then thus contains at least the identifier of the shipment 4 and the signature for at least the identifier of the shipment 4, for example.

By way of example, the private key and the corresponding public key (which may be stored on a multiplicity of devices 50 of delivery agents 5, for example) can be changed at intervals, for example daily.

The second information can be presented/communicated or transmitted, depending on its form, to the device 50 or to the delivery agent 5 by the person or the device of said person who/which has received the second information, in different ways:

By way of example, the second information can be communicated to the delivery agent 5 orally by the person (particularly the recipient 6), shown on a display unit of a device of the person (particularly the device 60 of the recipient 6) or transmitted from a device of the person (particularly the device 60 of the recipient 6) to the device 50 of the delivery agent, particularly by wireless communication, for example by means of Bluetooth or NFC. This can advantageously be effected at the time of delivery of the shipment. The second information can also be communicated to the device 50 of the delivery agent by virtue of the device of the person transmitting the second information to an apparatus that then transmits the second information or information derived therefrom, for example a clearance for the shipment 4 for handover, to the device 50 of the delivery agent 5.

The second information can alternatively also be provided at the delivery address by the person for capture such that it can be captured and evaluated by the delivery agent 5 or the device 50 of said delivery agent even in the absence of the person (and possibly of other recipients 6). By way of example, the second information may be printed on a label, or presented by an electronic display unit, such that it is optically capturable and, in particular, evaluable by the delivery agent 5 himself. The label or the electronic display unit can also reproduce the second information in a form that is optically capturable by the device 50 of the delivery agent 5, for example in the form of a barcode. By way of example, the label or the display unit may be arranged at or in proximity to a receiving compartment for the shipment 4, for example a parcel box associated with the person, into which the delivery agent can deliver the shipment 4 if the check on the second information has a positive outcome.

Alternatively, the second information can be provided by the person in electronically transmittable form, for example for capture by means of the device 50 of the delivery agent 5. To this end, the person has, by way of example, stored the second information in a memory (for example via a wireless or wired interface) that can be accessed by radio (for example only after successful authentication, however) or that transmits its information by radio. By way of example, the memory can be read following successful authentication of the device 50 of the delivery agent to an apparatus (for example a module for building automation, such as a Smart-Home module, for example, or an access control unit for a parcel box that controls access to the parcel box) that comprises the memory. Alternatively, the memory may be part of a radio beacon that at least intermittently transmits the content of the memory. Both the apparatus and the radio beacon may be arranged at or in proximity to a receiving compartment for the shipment 4, for example a parcel box associated with the person, into which the delivery agent 5 can then deliver the shipment 4 if the check on the second information has a positive outcome.

As a further variant, there may be provision for the delivery agent 5, if he does not find the recipient 6 at the time of the delivery, but would fundamentally have opportunities to deliver the shipment 4 (e.g. into a parcel box or to a neighbor) if the second information were available, to make contact with the person or the device of said person who/which has received the second information in order to request the second information. The communication address of the person, or of the device of the person that is needed for making contact (e.g. a (mobile) telephone number, an E-mail address or an instant messaging address, to cite just a few examples) may be stored in the device 50 of the delivery agent 5 in a data record for the shipment 4 or may be contained in an apparatus that, following successful authentication of the delivery agent 5 or of the device 50 of the delivery agent 5 to the apparatus, takes the communication address as a basis for setting up a communication (for example a telephone call, or a video telephone call, or an instant messaging session) between the delivery agent 5 and the person, in which the person can communicate the second information to the delivery agent 5.

For the description of the method 300, it has been assumed by way of example that all shipments 4 in the system 1 in FIG. 1 are shipments that contain a good that has not yet been paid for or that only first information is received on the server 2 for shipments 4 that each contain goods that have not been paid for. If this is not the case and shipments that contain goods that have already been paid for are also delivered in the system 1 in FIG. 1, then a distinction regarding whether shipments containing goods that have not been paid for or shipments containing goods that have been paid for are involved may be useful in the method 300. By way of example, subsequent to step 301, a step 302 (shown in dashes) can be performed that is used to check whether the shipment for which first information has been received in step 300 is a shipment that contains a good that has not been paid for. If this is the case, then step 303 is performed. Otherwise, the method skips to step 306. By way of example, the check in step 302 may be based on information that is contained in the first information (for example in addition to an identifier for the shipment) and explicitly indicates whether or not the shipment contains a good that has not been paid for. Alternatively, the check in step 302 may be based on an identifier that the first information contains for the shipment and a database that indicates for each identifier whether or not the respective shipment is a shipment containing a good that has not been paid for.

It should be emphasized that if first information pertaining to a shipment containing a good that has not been paid for is received in step 301, initiation of the process according to step 303 is regarded as taking place in response to this first information being received, even if the optional intermediate step 302 is also performed in addition.

As already indicated, step 302 may be dispensable, however, if exclusively first information relating to shipments 4 that contain a good that has not been paid for is received on the server 2. This can be controlled by the apparatuses that generate the first information, as explained below with reference to FIG. 4.

The predetermined station is a station from a succession of stations at which the shipment 4 respectively arrives during the delivery process for the shipment 4. In the exemplary system 1 in FIG. 1, this succession of stations comprises, by way of example, the first sorting station 10, the second sorting station 11, a station at which the delivery vehicles 12 are loaded, and a last station at which the shipment 4 is delivered, that is to say directly to the recipient 6, at the compartment 7, at a storage site or the store 8, for example. These stations have capture units 101, 111 or 13 (which is used to capture data of shipments that are loaded into the vehicles 12, for example) installed and/or in use at them, for example, which capture data of the shipment 4, the first information being generated in response to the capture of the data of the shipment 4, and the first information comprising or being derived from at least some of the captured data, for example. Alternatively, it is possible for a device 50 of the delivery agent 5 to be used at or in front of a station, particularly the last station, at which the shipment 4 is delivered, in order to generate the first information, for example when initiated by determination, performed by the device 50, that the distance between the device 50 and the predetermined station has dropped below a predetermined value, or by capture, performed using the device 50, of data of the shipment 4.

Figure 4:
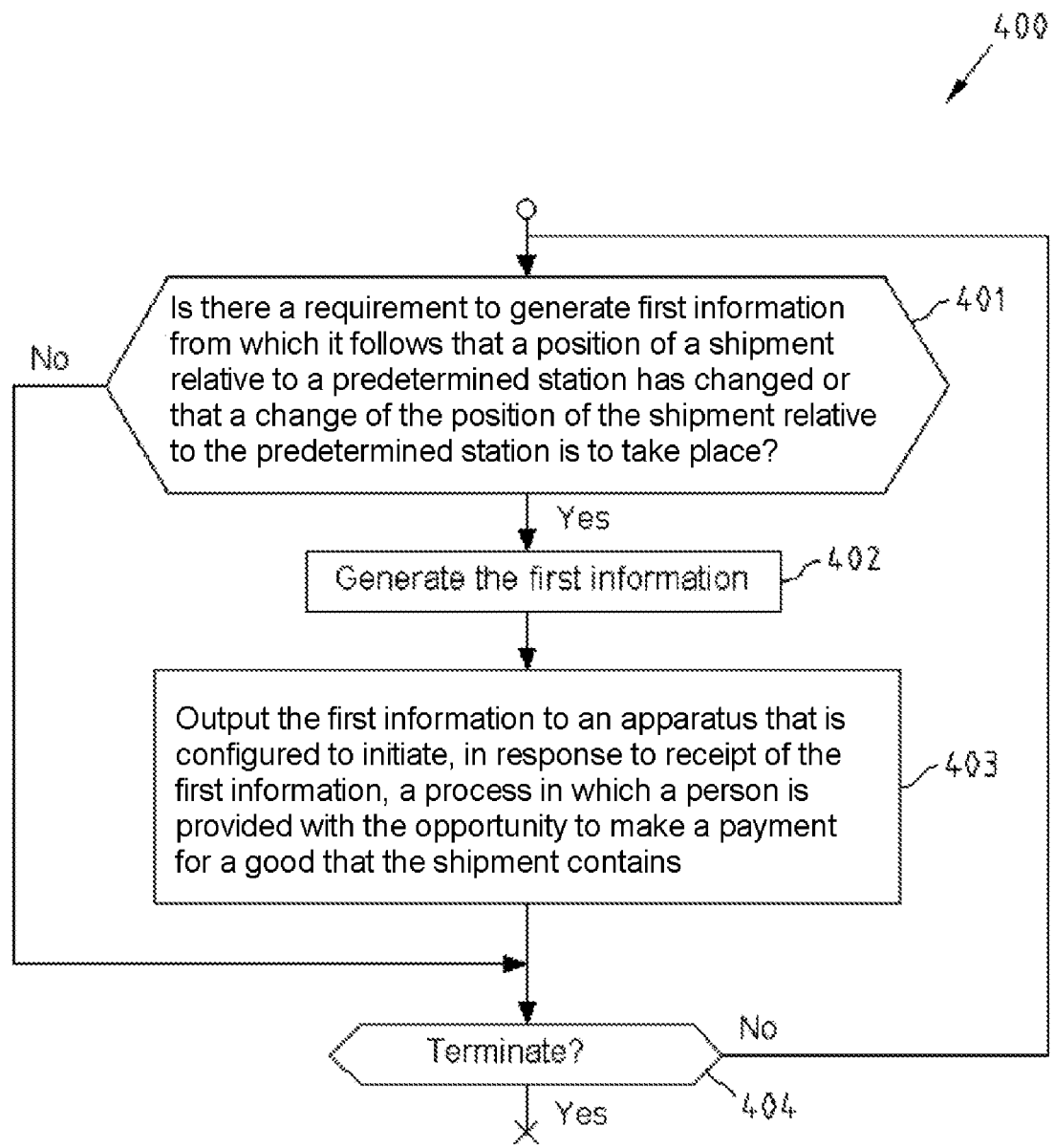
FIG. 4 shows a flow chart for an exemplary embodiment of a method according to the second aspect of the present invention.

The method 400 performed for this purpose by the capture units 101, 111 and 13, the device 50 of the delivery agent 5 or a control unit of the compartment 7 is shown in FIG. 4.

A step 401 is used to check whether it is necessary to generate first information from which it follows that a position of a shipment 4 relative to a predetermined station has changed or that a change of the position of the shipment relative to the predetermined station is to take place. By way of example, generation may be necessary if data of a shipment 4 have been captured or if another event has occurred that necessitates generation of the first information.

If the check in step 401 has a positive outcome, step 402 is used to generate the first information, and step 402 is used to output said information to an apparatus (particularly the server 2) that is configured to initiate, in response to receipt of the first information, a process in which a person is provided with the opportunity to make a payment for the good.

Subsequently, and even if the check in step 401 has had a negative outcome, step 404 is performed and a check is performed to determine whether the method 400 is to be terminated. If this is the case, then termination takes place. Otherwise, the method 400 returns to step 401.

The capture units 101, 111 and 13 and also the device 50 of the delivery agent 5 can perform step 402, that is to say generation of the first information, for example in response to capture of data of a shipment 4. From the point of view of the server 2, receipt of such first information reflects that the shipment 4 has just reached (or has just left) the respective station associated with the capture unit 101, 111 or 13 and therefore the data of said shipment have been captured, or that the shipment 4 has just reached the last station at which the delivery is made (see reference symbols 6, 7 and 8 in FIG. 1) and therefore the delivery agent 5 has used the device 50 to capture the data of the shipment 4. From the point of view of the server 2, the reaching of a station means a change in the position of the shipment 4 relative to the station, regardless of whether or not the previous position of the shipment 4 was specifically known, since the shipment 4 had evidently not yet reached the station beforehand.

By way of example, the data of the shipment 4 are associated with the shipment 4 in coded or uncoded form, for example printed (e.g. as a barcode) or electronically stored in a memory element associated with the shipment 4. By way of example, the data of the shipment 4 are captured optically (particularly by a scanner or barcode reader) or by radio transmission (e.g. by an RFID or NFC reader).

By way of example, the data of the shipment 4 comprise an identifier for the shipment 4, for example what is known as a shipment number, which can also be used to track the shipment 4. By way of example, the data of the shipment 4, particularly the identifier, are captured both for the purposes of shipment tracking and for the purpose of the process in which the person is provided with the opportunity to make the payment for the good.

By way of example, the generated first information comprises at least the identifier of the shipment 4. By way of example, it may further contain information that the shipment 4 is a shipment containing a good that has not been paid for, this then being able to be used by the server 2 in optional step 302, for example, which is discussed above in relation to FIG. 3. This information can likewise be contained and accordingly captured in the data of the shipment 4. Alternatively, the first information generated in step 402 contains no such information. In that case, as already explained, the identifier of the shipment 4 and a database can be used in the server 2, in step 302 in FIG. 3, to establish whether or not the shipment 4 for which first information has been received is a shipment containing a good that has not been paid for.

Alternatively, however, it is possible to establish as early as in step 401 in FIG. 4, in which it is established whether it is actually necessary to generate first information, that no first information needs to be generated for shipments that contain goods that have been paid for. Steps 401 and 402 are then not performed, which saves computation power and transmission capacity, in particular. The first information is then generated only for shipments containing goods that have not been paid for. The optional step 302 in FIG. 3 is then dispensable.

The first information can also comprise information about the apparatus that has generated the first information and/or has captured the data of the shipment 4, and/or about the station associated with the apparatus (e.g. an identifier for the apparatus and/or the station, and/or the location of the apparatus and/or the station), and/or information pertaining to the time of generation of the first information and/or of capture of the data of the shipment 4.

The device 50 of the delivery agent 5 can step 402, that is to say generation of the first information, for example also in response to determination that the distance of a current position of the device 50 from the predetermined station, particularly the delivery address, has fallen below a predetermined value. Given an appropriate choice of the predetermined value, for example (particularly depending on the size of the delivery area served by the delivery agent) 1 km, 500 m, 100 m or 50 m, to cite just a few values, this may be a clear indicator for the server 2 that the shipment 4 has almost reached the predetermined (last) station and therefore the process in which the person is provided with the opportunity to make a payment for the shipment should be initiated. The payment for the shipment has then advantageously been made at the time of the delivery, that is to say when a delivery address was reached by the delivery agent 5, particularly without the involvement of the delivery agent 5. The latter is made aware that the payment has been made only by the server 2 (or by the recipient 6) in accordance with step 305 in FIG. 3, and is able to deliver the shipment 4 (e.g. to hand it over to the recipient 6, or to place it into the compartment 7, or to deliver it to a storage site, or to put it into the store 8).

By way of example, the device 50 of the delivery agent 5 determines its position on a regular or irregular basis, particularly by receiving positioning signals from satellites 14, and then computes the respective distance from those last stations at which shipments that contain goods that have not been paid for are due to be delivered. When one of the distances falls below the predetermined value (which may also be defined differently for different last stations), steps 402 and 403 are then performed. Alternatively, the device 50 of the delivery agent 5 can also assume, on receiving a radio signal that is transmitted by an apparatus at the location of the predetermined station and, by way of example, contains an identifier and/or address for the predetermined station (and/or an identifier for the shipment to be delivered), that the distance of the device 50 or of the delivery agent 5 from the predetermined station has fallen below a predetermined value (which correlates to the range of the radio signal, for example), and can perform steps 402 and 403 in response thereto.

The generated first information can then contain an identifier for the shipment 4 and/or an identifier for the device and/or information pertaining to the last station and/or a current distance from the last station and/or a time of generation of the first information and/or of determination of the predetermined value has been undershot, for example. The generated first information can further contain information that the shipment 4 contains a good that has not been paid for.

Alternatively, if the device 50 has no information concerning which of the shipments contain goods that have not been paid for, the respective distance of all shipments that the delivery agent 5 has to deliver on one day from the respective last station can be determined on a regular or irregular basis. When one of the distances falls below the predetermined value (which may also be defined differently for different last stations), steps 402 and 403 are then performed. The generated first information may then contain an identifier for the shipment 4 and/or an identifier for the device and/or information pertaining to the last station and/or the distance from the last station and/or a time of generation of the first information and/or of determination of the predetermined value has been undershot, for example.

Instead of the device 50, the server 5 for or another unit can also determine the distance between the device 50 of the delivery agent and the last station and then generate the first information when the predetermined value has been undershot. A prerequisite for this is that the server 2 or the other unit has knowledge about the position of the device 50. This can be accomplished by means of regular or irregular transmissions of the position of the device 50, as determined by the device 50, to the server 2 or the other unit, for example. In step 301, a first (e.g. logical) component of the server 2 then receives the first information from a second (e.g. logical) component of the server 2, for example Instead of the capture units 101, 111, 13 and the device 50 of the delivery agent 5, the first information can also be generated by a unit, particularly a control unit, of the compartment 7, for example in response to a predetermined action by the recipient 6 or another person (e.g. a start of the interaction of the recipient 6 or the person with the control unit to take out the shipment 4, or successful authentication of the recipient 6 or the person to the control unit) who wishes to remove the shipment 4 delivered into the compartment 7 from the compartment 7. Such first information indicates to the server 2 that the shipment 4 is to be removed from the predetermined (last) station or a change of the position of the shipment 4 relative to the predetermined (last) station is to take place. In this case, the first information may comprise, by way of example, an identifier for the shipment 4 and/or an identifier for the compartment 7 and/or the apparatus that provides the compartment 7, and/or a time of generation of the first information and/or of capture of the predetermined action. If known, it is also possible for information that indicates whether the shipment 4 contains a good that has not been paid for to be contained in the first information. However, as already explained, it is possible, in cases in which the control unit knows that the shipment 4 does not contain a good that has not been paid for, for the generation and transmission of the first information not to be performed. By way of example, it is possible for the shipment 4 to be taken out of the compartment 7, even with successful authentication to the control unit, only if the control unit has been informed by the server 2 (particularly through receipt of the second information in accordance with step 305 in FIG. 3) that payment for the good is regarded as having been made. In the case of this exemplary embodiment of the present invention, the shipment 4 can be delivered into the compartment 7 before the good is actually paid for, for example. A condition for the shipment 4 to be taken out of the compartment 7 is then that the good has been paid for, however. This is advantageous for the recipient 6 or the other person insofar as the period between the payment being made and the shipment being received from the compartment 7 is made as short as possible. Advantageously, however, there is no longer a requirement for payment collection by the delivery agent, or for a payment apparatus on the apparatus that contains the compartment 7, in this case either.

The apparatus that contains the compartment 7 may be a package station, for example, but alternatively also other apparatuses having one or more compartments for which access can be controlled, that is to say particularly may be made dependent on the availability of a payment that has been made for the good. Nonexhaustive examples of such apparatuses are parcel boxes (recipient containers, associated with one or more recipients, for parcels in direct proximity to the residence or place of business of the one or more recipients) or vehicles having lockable compartments (e.g. trunks). Access can be controlled by a control center, for example, and made dependent on the availability of a payment that has been made. By way of example, an access code that is needed to open the compartment is made available to the recipient 6 or another person only when payment for the shipment has been made.

For the description of the method 300 in FIG. 3, it has been assumed by way of example that if the check in step 304 has a negative outcome, that is to say if it is established that payment for the good is regarded as not having been made, then the method skips to step 306. However, this can lead to there being no second information available for the delivery agent 5 on arrival at the last station, that is to say that it cannot deliver the shipment 4 owing to payment not having been made, or he needs to collect payment himself from the recipient 6, for example. To prevent this, it is possible, in the event of a negative check in step 304, not to branch to step 306 but rather to perform error handling. By way of example, this can involve performing step 303 repeatedly, particularly with a predetermined maximum number of possible repetitions, for example twice more. If no payment has then been made after the maximum number of possible repetitions, it is possible to output information to the person, for example, indicating that delivery cannot be made without payment for the good having been made and that the delivery process is interrupted until the payment has been made, and the shipment is returned to the sender as undeliverable after a set period (e.g. 2 weeks), for example. The delivery process can advantageously be interrupted by virtue of the shipment 4 being put into a temporary store 18 until the payment has been made, and being fetched from the temporary store 18 again for further processing only at that time (or after the set period has elapsed to no avail). Putting the shipment 4 into a temporary store is advantageous particularly when the first information is provided in the first sorting center 10 or in the second sorting center 11, that is to say at a relatively early station in the succession of stations, since it may be possible to implement simple storage options here and the return route in the event of a return is also shorter. By way of example, the information issued to the person may contain information concerning where it is possible to pay for the good outside the process initiated in step 303, for example in a branch of the delivery company, or on a web page from which a link is provided. If a payment for the good is then made outside the process initiated in step 303 within the set period, then step 305 in FIG. 3 can be performed and processing/delivery of the shipment 4 can be resumed.

Figure 5:
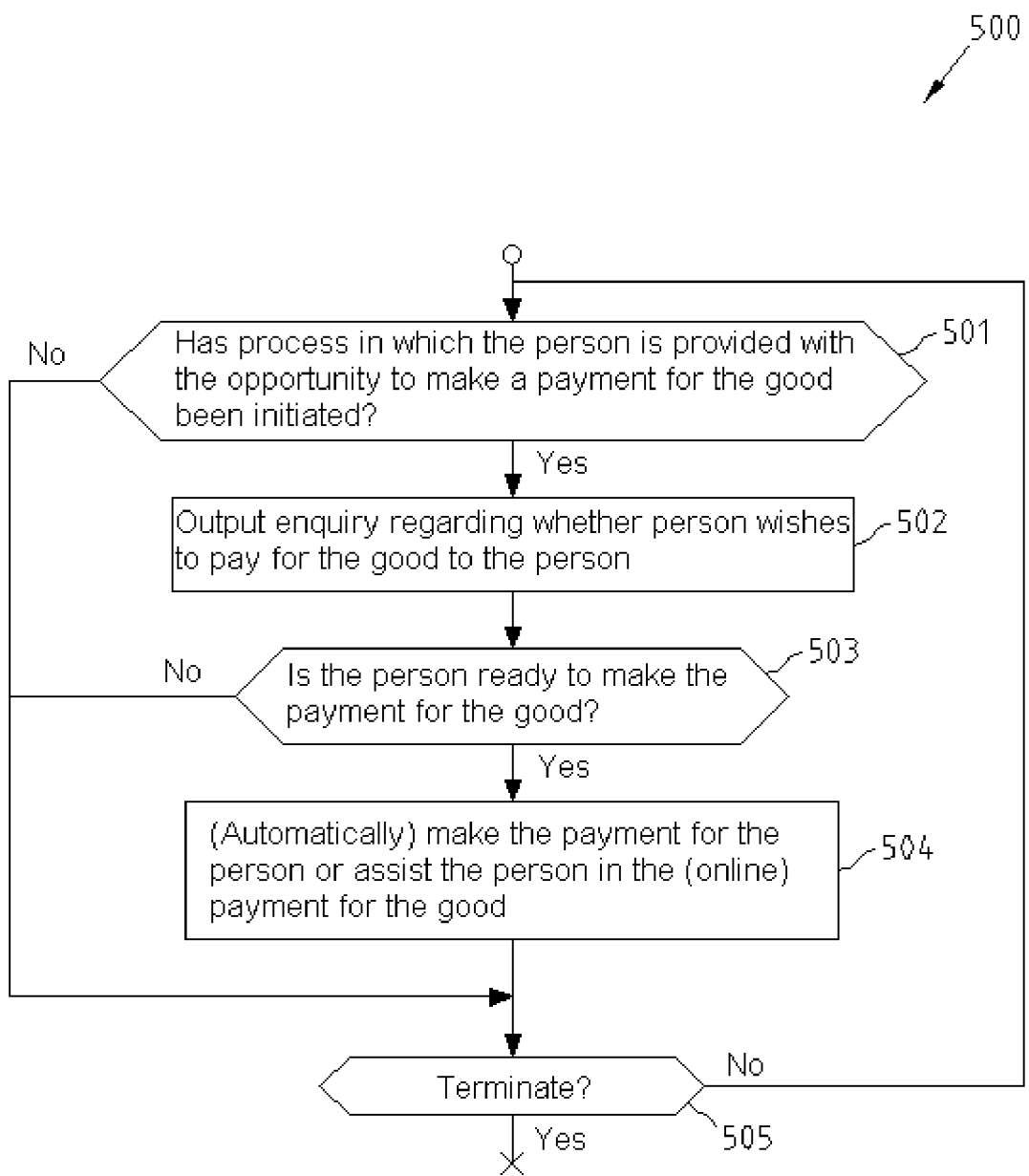
FIG. 5 shows a flow chart for an exemplary embodiment of step 302 from the flow chart 300 in FIG. 3 according to the present invention.

Exemplary details of the process initiated in step 303 in FIG. 3, in which the person is provided with the opportunity to make the payment for the good, are now described on the basis of the flow chart 500 of FIG. 5.

First of all, step 501 is used to check whether the process has been initiated. This is useful when multiple threads to be processed in parallel are executed on the server 2, for example.

If this is the case, step 502 is used to output an enquiry to the person regarding whether the person wishes to pay for the good. By way of example, the enquiry can be addressed to a device of the person, for example to the device 60 of the recipient 6, by means of a standard message format, such as E-mail, SMS, MMS, WhatsApp, etc., for example. The enquiry can also be addressed specifically to a program on a device of the person, particularly to what is known as an app (particularly of the delivery company), which is then started on receipt of the enquiry and displays the content of the enquiry to the user. By way of example, this can also involve the use of the Apple Push Notification Service (APNS) for apps on devices having iOS as the operating system or the Cloud-To-Device-Messaging (C2DM) or Google Cloud Messaging (GCM) service for apps on devices having the Android operating system. These services allow a server, such as the server 2, for example, to send messages to an app, for example if the app is registered with the server 2. In this case too, talking to the app on a particular device requires an identifier or address that identifies the app on the device (or at least the device).

A communication address (e.g. an E-mail address, or a mobile radio number, etc.) of the person (who may be the recipient 6, for example, but also another person for whom payment for the good is to be made possible instead of the recipient) that is to be used for the enquiry is stored on the server 2, for example, in a database, for example such that it is associated with an identifier for the shipment 4 and can be determined from the database via the identifier of the shipment 4. This communication address or an (in particular anonymized) identifier (e.g. a customer number) associated with this communication address may have been communicated to the server 2 by the sender 3 on surrender of the shipment 4, for example (the sender 3 has requested the communication address or the identifier associated therewith from the purchaser as part of the purchase handling, for example). This communication address has then been associated with an identifier for the shipment 4 on the server 2, for example (if merely an identifier associated with the communication address has been communicated to the server 2, then the communication address is obtainable from said identifier on the server 2, for example from a database, which means that in this case too, it is possible for the identifier of the shipment 4 to be associated with this communication address on the server 2).

If the sender 3 does not communicate a communication address or an identifier associated therewith to the server 2, then the server 2 can obtain the communication address from a database, for example, in which postal address information is associated with communication addresses. By way of example, a communication address for the person (particularly the recipient 6) associated with this delivery address can then be univocally inferred from the information surname, first name and mailing address, as contained in the delivery address for the shipment. By way of example, the database may contain only the communication addresses of persons who have registered with the delivery company for this purpose or have at least stored their delivery address and the associated communication address. However, the database may also contain communication addresses that have been acquired without the cooperation of the respective person associated with the communication address, for example from directories, telephone books, etc.

If the enquiry is to be sent to an app on a device of the person, it is normally necessary for the app to be installed on the device of the person, as part of which the person can register on the server 2, for example, so that the server 2 can talk to the app. By way of example, the server 2 then keeps a database that stores, for each of the persons registered in this manner, e.g. postal address information (surname, first name, address) and the associated identifier or address of the app on the device (or at least of the device) of the person. By way of example, it is therefore possible to use the delivery address on the shipment 4 to determine the identifier or address of the app (or at least of the device) via the database. By way of example, when the shipment 4 is surrendered by the sender 3, it is possible to determine the identifier or address of the app (or at least of the device) from the delivery address indicated by the sender 3 and from the database and to associate it with an identifier for the shipment 4.

By way of example, the enquiry in step 502 can contain information pertaining to the good, particularly the price of the good, and/or information pertaining to the sender/vendor and/or pertaining to the item of the good itself. By way of example, this information may likewise have been communicated to the server 2 by the sender 3 on surrender of the shipment 4 and stored on said server, in combination with the identifier of the shipment 4.

The enquiry can be answered by the person in the same message format as that in which it was received, for example, that is to say as an E-mail reply, SMS reply, MMS reply, WhatsApp reply, etc., for example. If the enquiry was addressed to an app on the device, then the app can provide a reply functionality, for example. In all of these variants, the communication address (particularly of the server 2) to be used for the reply can be obtained implicitly from the enquiry, or may be indicated in the enquiry (for example as "Reply To" information in the case of an E-mail). Alternatively, the enquiry may also contain a link, for example a Uniform Resource Locator (URL), however, whose associated information (particularly a web page) can be visited in the event of the user being ready to make the payment for the good.

Step 503 is used to establish, particularly on the basis of the reaction of the person to the enquiry, whether the person is ready to make the payment for the good. If this is not the case, then the method skips to step 505. Otherwise, step 504 is used to make the payment, in particular automatically, for the person, or alternatively to assist the person in the payment, particularly in the online payment, for the good.

The person can make himself ready to make the payment for the good by means of a positive response to the enquiry, for example, particularly in a predetermined response format that prescribes or permits only the responses "YES" and NO" for example. By way of example, an E-mail enquiry or SMS can accordingly be answered with an E-mail or SMS that contains only the information "YES" or "NO" as text in the body of the message. An app via which the enquiry is received may also be designed similarly, that is to say permit only a positive or negative reply in a predefined format, for example. If the enquiry contains a link, however, then visiting the information (particularly a web page) associated with the link can be considered to be readiness to make the payment. Such a visit by using the link can be captured by means of known tracking methods. In this case, it is naturally possible to provide two links instead of just one link, and visiting the information associated with one of the two links is assumed to mean that the person is ready to make the payment for the good, and visiting the information associated with the other of the two links is assumed to mean that the person is not ready to make the payment for the good.

If the payment is performed automatically for the person in step 504, then this can be accomplished without further actions by the person, for example. The person has then provided his consent to the payment being made by virtue of the positive response to the enquiry. The payment is then made by the server 2, for example. By way of example, the server 2 does so by using payment information that the person has stored on a server 2 beforehand, particularly as part of registration.

By way of example, the server 2 may be configured to make the payment for the person (in particular automatically) by means of one (for example selected by the person beforehand) of the following payment methods: payment based on credit card information, payment by direct debit, payment by transfer, payment via a payment system provider (e.g. PayPal), with which the person has an account, payment using a prepaid credit card or prepaid code or payment by cell phone invoice.

By way of example, the server 2 can take on the function of a payment service provider that is customary for online shops, that is to say can enable the purchaser to pay for the good in accordance with one or more payment methods. However, this involves the server 2 resorting to stored payment information of the person instead of requesting said payment information from the person afresh for every payment. Preferably, the payments are credited not to the account of the sender 3 but rather to one or more accounts of the delivery company, and then credited from these accounts to the respective sender 3 only in a downstream process, for example. This can simplify and/or speed up the payment process, since at the time of the payment, it is not necessary for shipment-specific/sender-specific account information to be taken into consideration. When handling the payment, the server 2 communicates with servers of banks 15, credit card companies 16 or payment service providers 17. These servers can provide payment interfaces (what are known as payment gateways), for example, by means of which payments can be made.

If the payment is to be made using credit card information, for example, then the delivery company (which operates the server 2) has registered with a credit card company, for example, and received an agreement number. To make the payment, the server 2 forwards this agreement number, the credit card information (e.g. credit card number and possibly security number or further information) of the person, which is stored on the server 2, and details pertaining to the level of the sum to the server of the credit card company 16, which has access to the credit card account of the person and performs the relevant transaction (crediting the sum from the account of the person to the account of the delivery company).

If the payment is to be made by direct debit, for example, then the server 2 transmits the account information (particularly account number and sort code) stored on the server 2 and also the account information of the delivery company to the server of the bank 15 of the delivery company. The bank of the delivery company then collects the direct debit from the bank of the person and credits to the account of the delivery company.

If the person has stored respective payment information, then the server 2 can also make payments in accordance with other payment methods (for example payments via payment service providers if the access data for the account of the person with a payment service provider are stored on the server 2).

Instead of performing the function of the service provider itself, the server 2 can also have this functionality performed, at least in part, by a payment service provider, however, which is then supplied with the information required for making the payment by the server 2, for example, and undertakes the communication with the servers 15, 16 or 17.

Alternatively, the person can also be presented with the option of managing a separate account on the server 2 that is directly debited as appropriate when the person is currently ready to pay for a good. The person can then "load" this account by means of a transfer, for example. The person can also be granted a certain credit line if payment for a good is not covered by the present account balance. In this alternative too, payment for the good can thus be made automatically in step 504 of the method 500.

In step 504 of the method 500, there is provision, as a variant, for the person to be assisted in making the payment by the server 2. By way of example, this can be accomplished by virtue of the server 2 performing the function of a payment service provider customary for online shops, but not making the payments on the basis of stored payment information of the person but rather requesting said payment information from the person in a dialog. In this case, the person is provided with a higher level of control over the payment transaction and does not have to store any payment information on the server 2. As soon as the payment information (for example credit card information in the case of a payment by credit card) has been indicated by the person, the server 2 can then make the payment as described above in communication with the servers 15, 16 or 17. In this variant, the spectrum of payment methods may be even more extensive than when the payment is made automatically by the server 2, since it is possible for the person to be involved in the payment process. By way of example, it is then also possible for payment methods such as payment by money card (in the case of which a money card is usually introduced into a card reader connected to a device of the person and a PIN needs to be input on this card reader) or payment by transfer (in the case of which a transaction-specific code, such as an mTAN or photo-TAN, for example, is normally delivered to the person on a separate communication channel at the time of the payment and needs to be specified by said person in order to complete the transaction), to cite just a few examples, to be supported.

In this variant too, the server 2 is able not to implement the functionality of the payment service provider, at least in part, itself, but rather to have it performed by a payment service provider. The payment service provider is then supplied with the information available on the server 2 by said server and obtains the missing information from the person.

The assisting the person in making the payment can be performed using the app on the device of the person, for example, which can also be used to address the enquiry in step 502 to the person. In particular, further information that the person requires for making the payment can be requested by the person using the app. Alternatively, the assisting the person in making the payment can also be performed by virtue of the person receiving a transmitted link, particularly a URL, that is associated with an information page, particularly a web page. On this web page, the person can be assisted in making the payment. By way of example, one payment method can be selected from multiple payment methods and then the payment transaction can be performed interactively in accordance with the selected payment method. Alternatively, just one payment method may be possible or one payment method may be stored as preferred by the person.

Step 505 is finally used to check whether the method 500 is to be terminated. If this is the case, then termination is effected, otherwise the method returns to step 501.

Figure 2:
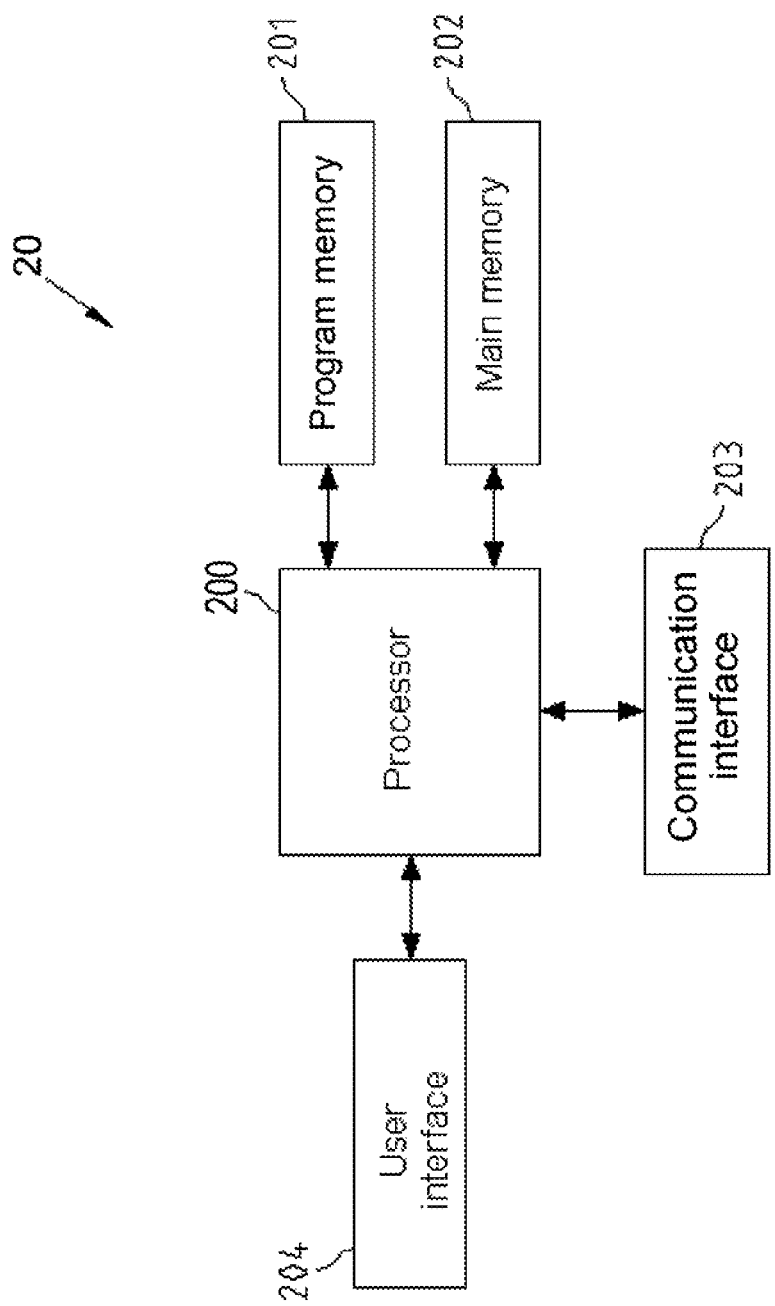
FIG. 2 shows a schematic illustration of an exemplary embodiment of an apparatus according to the first or second aspect of the present invention.

FIG. 2 finally shows a schematic illustration of an exemplary embodiment of an apparatus 20 according to the first or second aspect of the invention.

By way of example, the apparatus 20 may embody an apparatus according to the first aspect of the invention and then be designed to perform and/or control the method 300 of FIG. 3, that is to say particularly as a server 2 or as a part thereof. Alternatively, the apparatus 20 may embody an apparatus according to the second aspect of the invention and then be designed to perform and/or control the method 400 of FIG. 4, that is to say particularly as one of the capture units 101, 111 or 13, as the device 50 of the delivery agent 5 or as a control unit for the compartment 7 (or in each case as a part thereof).

Apparatus 20 comprises a processor 200 having an associated main memory 202 and program memory 201. By way of example, the processor 200 executes program instructions that are stored in the program memory 201. The program instructions perform the method according to the first aspect or the second aspect of the invention and/or control said method. Hence, the program memory 201 contains a computer program according to the first or second aspect of the invention and is a computer program product for storing said computer program.

By way of example, the program memory 201 may be a persistent memory, such as a read only memory (ROM). By way of example, the program memory 201 may be permanently connected to the processor 200, but may alternatively also be detachably connected to the processor 200, for example as a memory card, floppy disk or optical data storage medium (e.g. a CD or DVD). The program memory 201, or a separate memory, may also store further information.

By way of example, the main memory 202 is used to store temporary results during the execution of the program instructions, and is a volatile memory, for example, such as a random access memory (RAM), for example.

The processor 200 is further operatively connected to a communication interface 203 that allows information interchange with other apparatuses, for example (in this regard see the dashed arrows in FIG. 1). The communication with the other apparatuses can be effected by wire or at least in sections wirelessly.

The apparatus 20 may also contain further components. If apparatus 20 represents the device 50 of the delivery agent, for example, then the optional user interface 204 may be provided, which is controlled by the processor 200 and allows the delivery agent to interact with the apparatus 20.

The following example embodiments of the invention are also disclosed:

Embodiment 1

Method comprising:
receiving first information from which it follows that a position of a shipment relative to a predetermined station from a succession of stations at which the shipment respectively arrives during a delivery process for the shipment has changed or that a change of the position of the shipment relative to the predetermined station is to take place, wherein the shipment contains a good that has not yet been paid for; and
initiating a process, in which a person is provided with the opportunity to make a payment for the good, in response to the receipt of the first information.

Embodiment 2

Method comprising:
generating first information from which it follows that a position of a shipment relative to a predetermined station from a succession of stations at which the shipment respectively arrives during a delivery process for the shipment has changed or that a change of the position of the shipment relative to the predetermined station is to take place, wherein the shipment contains a good that has not yet been paid for; and
outputting the first information to an apparatus that is configured to initiate, in response to receipt of the first information, a process in which a person is provided with the opportunity to make a payment for the good.

Embodiment 3

Method according to any of the preceding embodiments, wherein it follows from the first information that the shipment has reached the predetermined station, and wherein the predetermined station is the last station in the succession of stations, particularly the address to which the shipment is to be delivered.

Embodiment 4

Method according to Embodiment 3, wherein the first information is generated in response to a capture of data of the shipment, wherein the capture is effected at the predetermined station using a device of a delivery agent for the shipment.

Embodiment 5

Method according to any of Embodiments 1-2, wherein it follows from the first information that the shipment has almost reached the predetermined station, and wherein the predetermined station is the last station in the succession of stations, particularly the address to which the shipment is to be delivered.

Embodiment 6

Method according to Embodiment 5, wherein the first information is generated in response to a capture of the entry of the shipment or of a delivery agent for the shipment into a predetermined area containing the predetermined station or in response to a capture indicating that the distance of the shipment or of the delivery agent for the shipment from the predetermined station has dropped below a predetermined value.

Embodiment 7

Method according to Embodiment 6, wherein the entry of the delivery agent for the shipment into the predetermined area or the drop below the predetermined value by the distance of the delivery agent from the predetermined station is captured by a device associated with the delivery agent, particularly a portable device of the delivery agent or a device that is at least temporarily installed in a vehicle of the delivery agent.

Embodiment 8

Method according to any of Embodiments 1-2, wherein it follows from the first information that the shipment has reached or left the predetermined station, and wherein the predetermined station is not the last station in the succession of stations and is particularly not the address to which the shipment is to be delivered.

Embodiment 9

Method according to any of Embodiments 1-2, wherein it follows from the first information that the shipment has reached or left the predetermined station, and wherein the predetermined station is a sorting station at which the shipment is sorted during the delivery process together with other shipments.

Embodiment 10

Method according to any of Embodiments 8-9, wherein the first information is generated in response to a capture of data of the shipment, wherein the capture is effected at the predetermined station automatically.

Embodiment 11

Method according to any of Embodiments 1-2, wherein it follows from the first information that the shipment is to be removed from the predetermined station, and wherein the predetermined station comprises a locked space into which the shipment has been placed particularly for collection by a recipient of the shipment.

Embodiment 12

Method according to Embodiment 11, wherein the first information is generated in response to a capture of a predetermined step of a process in which a person gains access to the locked space to take out the shipment.

Embodiment 13

Method according to Embodiment 12, wherein the predetermined step is captured by an apparatus associated with the locked space, particularly an apparatus that controls access to the locked space.

Embodiment 14

Method according to any of the preceding embodiments, insofar as it refers back to Embodiment 1, further comprising:
outputting second information in response to payment for the good being regarded as having been made, particularly to the delivery agent for the shipment or to a device of the delivery agent for the shipment or to the recipient of the shipment or to a device of the recipient of the shipment.

Embodiment 15

Method according to Embodiment 14, wherein the second information is output to the recipient of the shipment or to a device of the recipient of the shipment, and wherein the second information or information derived therefrom is used as evidence of the payment that is regarded as having been made for the good to the delivery agent or to a device of the delivery agent.

Embodiment 16

Method according to any of the preceding embodiments, wherein the process comprises at least the following:
outputting an inquiry as to whether a person, who is particularly the recipient of the shipment and/or the purchaser of the good, wishes to pay for the good, to the person; if it follows from a reaction by the person to the inquiry that the person wishes to pay for the good, performing payment for the good for the person or assisting the person in paying for the good.

Embodiment 17

Method according to Embodiment 16, wherein the performing payment for the good for the person is effected at least on the basis of stored payment information of the person.

Embodiment 18

Method according to Embodiment 16, wherein the assisting the person in paying for the good is performed by a software application on a device of the person or using a, in particular interactive, web page.

Embodiment 19

Method according to any of Embodiments 16-18, wherein the payment for the good is performed in one of the following ways:
payment on the basis of credit card information;
payment by direct debit;
payment by transfer;
payment by money card;
payment via a payment system provider at which the person has an account;
payment by prepaid credit card or prepaid code; or
payment by cell phone invoice.

Embodiment 20

Method according to any of the preceding embodiments, wherein the payment for the good is made to a second entity, which is different from a first entity, which is the vendor of the good and/or the sender of the shipment, and particularly acts as a bill collection service provider.

Embodiment 21

Method according to Embodiment 20, wherein the second entity is part of a company that performs at least part of the delivery process or is economically associated with such a company.

Embodiment 22

Apparatus configured to perform and/or control the method according to any of Embodiments 1-21 or comprising respective means for performing and/or controlling the steps of the method according to any of Embodiments 1-21.

Embodiment 23

Apparatus comprising at least one processor and at least one memory that contains program code, wherein the memory and the program code are configured to use the at least one processor to cause an apparatus to perform and/or control at least the method of any of Embodiments 1-21.

Embodiment 24

System comprising one or more apparatuses that are configured to perform and/or control the method according to any of Embodiments 1-21 or have means for performing and/or controlling the steps of the method according to any of Embodiments 1-21.

Embodiment 25

Computer program comprising program instructions that cause a processor to perform and/or control the method according to any of Embodiments 1-21 when the computer program runs on the processor.

The exemplary embodiments of the present invention that are described in this specification are intended to be understood as disclosed individually and in all combinations with one another. In particular, the description of a feature that an embodiment comprises is—unless explicitly explained to the contrary—also not intended to be understood, in the present case, to mean that the feature is indispensable or is essential to the function of the exemplary embodiment. The sequence of the method steps outlined in the specification in the individual flow charts is not imperative, and alternative sequences of the method steps are conceivable. The method steps can be implemented in different ways, and implementation in software (by virtue of program instructions), hardware or a combination of the two is conceivable for implementing the method steps. Terms used in the patent claims such as "comprise", "have", "contain", "include" and the like do not exclude further elements or steps. The wording "at least in part" covers both the "in part" case and the "in full" case. The wording "and/or" is intended to be understood to mean that both the alternative and the combination are intended to be disclosed, that is to say that "A and/or B" means "(A) or (B) or (A and B)". Within the context of this specification, a plurality of units, persons or the like means multiple units, persons or the like. The use of the indefinite article does not exclude a plurality. A single device can carry out the functions of multiple units or devices cited in the patent claims. Reference symbols specified in the patent claims are not intended to be regarded as limitations for the means and steps employed.

The invention claimed is:

1. A method of operating a server configured to coordinate payment for a good contained in a shipment during a delivery process, the method comprising:
receiving, by the server, first information indicating that the shipment has reached a predetermined stage of the delivery process, wherein the predetermined stage is prior to reaching a delivery address of the shipment and wherein the first information is generated in response to a change of a position of the shipment relative to the predetermined stage detected by a sensor of a capture unit at a sorting station or by a sensor of a device of a delivery agent involved in the delivery process;
communicating, by the server, with a device of a person, automatically in response to receiving the first information, in order to initiate an electronic payment process involving communication between the server and a further server of a financial institution, in which the person is provided with the opportunity to make a payment for the good prior to the shipment reaching the delivery address, in response to the receipt of the first information;
confirming, by the server, that the payment for the good has been successfully completed;
generating second information by the server, the second information being necessary to effect delivery of the shipment; and
transmitting, by the server, the second information cryptographically signed and/or through an encrypted connection, in order to ensure the authenticity and/or integrity of the second information, to at least one of a device of a recipient or to the device of the delivery agent only after confirming that the payment has been successfully completed.

2. The method according to claim 1, wherein the first information is generated in response to a capture of the entry of the shipment or of the delivery agent for the shipment into a predetermined area containing the delivery address or in response to a capture indicating that a distance of the shipment or of the delivery agent for the shipment from the delivery address has dropped below a predetermined value.

3. The method according to claim 2, wherein the entry of the delivery agent for the shipment into the predetermined area or the drop below the predetermined value by the distance of the delivery agent from the delivery address is captured by the device of the delivery agent.

4. The method according to claim 1, wherein it follows from the first information that the shipment has reached the predetermined stage, and wherein the predetermined stage is a sorting station at which the shipment is sorted during the delivery process together with other shipments.

5. The method according to claim 4, wherein the first information is generated automatically at the predetermined stage.

6. The method according to claim 1, wherein the second information is transmitted to the device of the recipient of the shipment, and wherein the second information or information derived therefrom is used as evidence of the payment that is regarded as having been made for the good to the device of the delivery agent.

7. The method according to claim 1, wherein the step of communicating with the device of the person further comprises:
outputting an inquiry as to whether the person wishes to pay for the good, to the person;
if it follows from a reaction by the person to the inquiry that the person wishes to pay for the good, performing payment for the good for the person or assisting the person in paying for the good.

8. The method according to claim 7, wherein the performing payment for the good for the person is effected at least on a basis of stored payment information of the person.

9. The method according to claim 7, wherein the assisting the person in paying for the good is performed by a software application on the device of the person or using a web page.

10. The method according to claim 1, wherein the payment for the good is made to a second entity, which is different from a first entity, which is a vendor of the good and/or a sender of the shipment.

11. The method according to claim 1,
wherein the person that is provided with the opportunity to make a payment for the good is a consignee of the shipment;
wherein the second information is used as evidence of the payment that is regarded as having been made for the good to a device of the delivery agent, and
wherein the device of the consignee of the shipment is arranged to display the second information for optical detection by the device of the delivery agent, to transmit it to the device of the delivery agent by means of Bluetooth or NFC transmission, or to transmit it to an apparatus at or in the vicinity of a storage space which provides the second information for optical or wireless detection by the device of the delivery agent.

12. The method according to claim 11,
wherein the second information is cryptographically signed and is checked for authenticity and integrity by the device of the delivery agent.

13. The method of claim 1, wherein the second information is cryptographically signed and/or transmitted through the encrypted connection using a public-private key pair in which the server holds the private key.

14. An apparatus comprising at least one processor and at least one memory containing program code, the memory and the program code configured to, with the at least one processor, cause an apparatus to perform and/or control a method of operating a server configured to coordinate payment for a good contained in a shipment during a delivery process, the method comprising:
receiving first information indicating that the shipment has reached a predetermined stage of the delivery process, wherein the predetermined stage is prior to reaching a delivery address of the shipment and wherein the first information is generated in response to a change of a position of the shipment relative to the predetermined stage detected by a sensor of a capture unit at a sorting station or by a sensor of a device of a delivery agent involved in the delivery process;
communicating with a device of a person, automatically in response to receiving the first information, in order to initiate an electronic payment process involving communication between the server and a further server of a financial institution, in which the person is provided with the opportunity to make a payment for the good prior to the shipment reaching the delivery address, in response to the receipt of the first information;
confirming that the payment for the good has been successfully completed;
generating second information by the server, the second information being necessary to effect delivery of the shipment; and
transmitting the second information cryptographically signed and/or through an encrypted connection, in order to ensure the authenticity and/or integrity of the second information, to at least one of a device of a recipient or to the device of the delivery agent only after confirming that the payment has been successfully completed.

15. The apparatus of claim 14, wherein the second information is cryptographically signed and/or transmitted through the encrypted connection using a public-private key pair in which the server holds the private key.

16. The apparatus according to claim 14, wherein the first information is generated in response to a capture of the entry of the shipment or of the delivery agent for the shipment into a predetermined area containing the delivery address or in response to a capture indicating that a distance of the shipment or of the delivery agent for the shipment from the delivery address has dropped below a predetermined value.

17. The apparatus according to claim 16, wherein the entry of the delivery agent for the shipment into the predetermined area or the drop below the predetermined value by the distance of the delivery agent from the delivery address is captured by the device of the delivery agent.

18. The apparatus according to claim 14, wherein it follows from the first information that the shipment has reached the predetermined stage, and wherein the predetermined stage is a sorting station at which the shipment is sorted during the delivery process together with other shipments.

19. The apparatus according to claim 18, wherein the first information is generated automatically at the predetermined stage.

20. The apparatus according to claim 14, wherein the second information is transmitted to the device of the recipient of the shipment, and wherein the second information or information derived therefrom is used as evidence of the payment that is regarded as having been made for the good to the device of the delivery agent.

21. The apparatus according to claim 14, wherein the communicating with the device of the person further comprises:
outputting an inquiry as to whether the person wishes to pay for the good, to the person;
if it follows from a reaction by the person to the inquiry that the person wishes to pay for the good, performing payment for the good for the person or assisting the person in paying for the good.

22. The apparatus according to claim 21, wherein the performing payment for the good for the person is effected at least on a basis of stored payment information of the person.

23. The apparatus according to claim 21, wherein the assisting the person in paying for the good is performed by a software application on the device of the person or using a web page.

24. The apparatus according to claim 14, wherein the payment for the good is made to a second entity, which is different from a first entity, which is a vendor of the good and/or a sender of the shipment.

25. A non-transitory computer-readable storage medium storing a computer program comprising program instructions that cause a processor, when the computer program runs on the processor, to perform and/or control a method of operating a server configured to coordinate payment for a good contained in a shipment during a delivery process, the method comprising:
receiving first information indicating that the shipment has reached a predetermined stage of the delivery process, wherein the predetermined stage is prior to reaching a delivery address of the shipment and wherein the first information is generated in response to a change of a position of the shipment relative to the predetermined stage detected by a sensor of a capture unit at a sorting station or by a sensor of a device of a delivery agent involved in the delivery process;
communicating with a device of a person, automatically in response to receiving the first information, in order to initiate an electronic payment process involving communication between the server and a further server of a financial institution, in which the person is provided with the opportunity to make a payment for the good prior to the shipment reaching the delivery address, in response to the receipt of the first information;
confirming that the payment for the good has been successfully completed;
generating second information by the server, the second information being necessary to effect delivery of the shipment; and
transmitting the second information cryptographically signed and/or through an encrypted connection, in order to ensure the authenticity and/or integrity of the second information, to at least one of a device of a recipient or to the device of the delivery agent only after confirming that the payment has been successfully completed.

* * * * *